United States Patent
Kang et al.

(10) Patent No.: US 11,310,808 B2
(45) Date of Patent: Apr. 19, 2022

(54) METHOD AND APPARATUS FOR CONFIGURING TRANSMISSION PRIORITY FOR DIRECT COMMUNICATION IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/859,737

(22) Filed: Apr. 27, 2020

(65) Prior Publication Data

US 2020/0344771 A1    Oct. 29, 2020

(30) Foreign Application Priority Data

Apr. 25, 2019   (KR) .................. 10-2019-0048607
Nov. 6, 2019    (KR) .................. 10-2019-0141262
Mar. 9, 2020    (KR) .................. 10-2020-0029168

(51) Int. Cl.
*H04W 72/10*    (2009.01)
*H04W 76/14*    (2018.01)
(Continued)

(52) U.S. Cl.
CPC ....... *H04W 72/10* (2013.01); *H04W 28/0263* (2013.01); *H04W 28/0268* (2013.01);
(Continued)

(58) Field of Classification Search
CPC . H04W 72/10; H04W 76/14; H04W 28/0268; H04W 28/0263; H04W 80/02;
(Continued)

(56) References Cited

U.S. PATENT DOCUMENTS

2017/0048903 A1   2/2017  Yi et al.
2020/0296619 A1*  9/2020  Pan ..................... H04W 76/14

FOREIGN PATENT DOCUMENTS

EP    3131352 A1    2/2017

OTHER PUBLICATIONS

Ganesan, Karthikeyan, et al. "5G V2X architecture and radio aspects." 2019 IEEE Conference on Standards for Communications and Networking (CSCN). IEEE, 2019. (Year: 2019).*

(Continued)

*Primary Examiner* — Sharad Rampuria

(57) ABSTRACT

A method, performed by a user equipment (UE), in a wireless communication system includes: obtaining sidelink logical channel configuration information corresponding to a logical channel and including a sidelink logical channel priority (sl-priority) parameter; selecting a destination associated with one of unicast, groupcast, and broadcast, based on the sidelink logical channel configuration information and sl-priority configured for each of at least one logical channel including sidelink data available for transmission; allocating sidelink resources to at least one logical channel corresponding to the destination based on the sl-priority configured for each of the at least one logical channel corresponding to the destination; multiplexing sidelink data included in the at least one logical channel corresponding to the destination to a medium access control (MAC) protocol data unit (PDU); and transmitting the MAC PDU to another UE using the sidelink resources.

20 Claims, 18 Drawing Sheets

(d) Inter-cell V2X communication scenario
(230)

(51) Int. Cl.
    *H04W 28/02* (2009.01)
    *H04W 80/02* (2009.01)
    *H04W 92/18* (2009.01)

(52) U.S. Cl.
    CPC ............ *H04W 76/14* (2018.02); *H04W 80/02* (2013.01); *H04W 92/18* (2013.01)

(58) Field of Classification Search
    CPC . H04W 92/18; H04W 72/1242; H04W 76/40; H04W 72/02; H04W 72/04; H04W 72/12; H04W 76/00; H04B 7/2121; H04B 7/2123; H04J 2203/0069; H04Q 2213/394
    See application file for complete search history.

(56) References Cited

OTHER PUBLICATIONS

Husain, Syed S., et al. "Ultra-high reliable 5G V2X communications." IEEE Communications Standards Magazine 3.2 (2019): 46-52. (Year: 2019).*

Spreadtrum Communications, "Logical channel prioritization Consideration", 3GPP TSG-RAN WG2 Meeting #105, Feb. 25-Mar. 1, 2019, R2-1900933, 3 pages.

Intel Corporation, "UE sidelink configuration for NR V2X", 3GPP TSG-RAN WG2 Meeting 105bis, Apr. 8-12, 2019, R2-1903657, 4 pages.

Huawei et al., "Channel mapping for NR SL", 3GPP TSG-RAN WG2 Meeting 105bis, Apr. 8-12, 2019, R2-1904082, 3 pages.

OPPO, "Discussion on BSR and UAI for mode-1", 3GPP TSG-RAN WG2 Meeting #105bis, R2-1903209, 4 pages.

"3rd Generation Partnership project; Technical Specification Group Radio Access Network; Evolved Universal Terrestrial Radio Access (E-UTRA); Radio Resource Control (RRC); Protocol specification (Release 15)", 3GPP TS 36.331 V15.5.1 (Apr. 2019), 948 pages.

Notification of Transmittal of the International Search Report and the Written Opinion of the International Searching Authority, or the Declaration dated Jul. 27, 2020 in connection with International Patent Application No. PCT/KR2020/005457, 9 pages.

European Patent Office, "Supplementary European Search Report" dated Feb. 28, 2022, in connection with European Patent Application No. 20794680.7, 12 pages.

Huawei et al., "Discussion about sidelink LCP procedure", R2-1904086, 3GPP TSG-RAN WG2#105-bis, Xi'an, China, Apr. 8-12, 2019, 4 pages.

Spreadtrum Communications, "Logical channel prioritization Consideration", R2-1903795 Revision of R2-1900933, 3GPP TSG-RAN WG2 Meeting #105bis, Xi'an, China, Apr. 8-12, 2019, 3 pages.

Catt, "LCP procedure for NR", R2-1704258, 3GPP TSG-RAN WG2 Meeting #97bis, Hangzhou, China, May 15-19, 2017, 5 pages.

* cited by examiner (d) Inter-cell V2X communication scenario
(230)

(a) Unicast V2X communication
(300)

(b) Groupcast V2X communication

METHOD AND APPARATUS FOR CONFIGURING TRANSMISSION PRIORITY FOR DIRECT COMMUNICATION IN WIRELESS COMMUNICATION SYSTEM

CROSS-REFERENCE TO RELATED APPLICATIONS

This application is based on and claims priority under 35 U.S.C. § 119 to Korean Patent Application No. 10-2019-0048607 filed on Apr. 25, 2019, Korean Patent Application No. 10-2019-0141262 filed on Nov. 6, 2019, and Korean Patent Application No. 10-2020-0029168 filed on Mar. 9, 2020 in the Korean Intellectual Property Office, the disclosures of which are incorporated by reference herein in their entirety.

BACKGROUND

1. Field

The disclosure relates to a method and apparatus for configuring (or setting) a priority of transmission packets for direct communication between terminals in a wireless communication system. Also, the disclosure relates to a method and apparatus for configuring a transmission priority of packets in a vehicle-to-everything (V2X) system of a next-generation wireless communication system.

2. Description of Related Art

To meet increasing demand with respect to wireless data traffic after the commercialization of 4th generation (4G) communication systems, efforts have been made to develop 5th generation (5G) or pre-5G communication systems. For this reason, 5G or pre-5G communication systems are called "beyond 4G network" communication systems or "post long term evolution (post-LTE)" systems. To achieve high data rates, implementation of 5G communication systems in an ultra-high frequency millimeter-wave (mmWave) band (e.g., a 60 GHz band) is being considered. To reduce path loss of electric waves and increase transmission distances of electric waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology. Also, vehicle-to-everything (V2X) using 5G communication systems is being researched, and it is expected that various services may be provided to users by using V2X.

SUMMARY

Embodiments of the disclosure provide an improved communication method and apparatus in a communication system.

Also, embodiments of the disclosure provide a method and apparatus for configuring a priority of transmission packets in a direct communication system between terminals.

Also, embodiments of the disclosure provide a method and apparatus for configuring a transmission priority of packets in a vehicle-to-everything (V2X) system of a next-generation mobile communication system.

Additional aspects will be set forth in part in the description which follows and, in part, will be apparent from the description, or may be learned by practice of the presented embodiments of the disclosure.

According to an embodiment of the disclosure, a method, performed by a user equipment (UE), in a wireless communication system includes: obtaining sidelink logical channel configuration information corresponding to a logical channel and including a sidelink logical channel priority (sl-priority) parameter; selecting a destination associated with one of unicast, groupcast, and broadcast, based on the sidelink logical channel configuration information and sl-priority configured for each of at least one logical channel including sidelink data available for transmission; allocating sidelink resources to at least one logical channel corresponding to the destination based on the sl-priority configured for each of the at least one logical channel corresponding to the destination; multiplexing sidelink data included in the at least one logical channel corresponding to the destination to a medium access control (MAC) protocol data unit (PDU); and transmitting the MAC PDU to another UE using the sidelink resources.

The obtaining of the sidelink logical channel configuration information may include obtaining the sidelink logical channel configuration from at least one of radio resource control (RRC)-dedicated signaling received from a base station, system information block (SIB) received from the base station, or configuration information pre-configured in the UE.

The sidelink logical channel configuration information may further include: a configuredGrantType1Allowed parameter which indicates whether a configured grant Type 1 can be used for transmission, and an identifier of a logical channel group (LCG ID).

The selecting of the destination may include selecting the destination corresponding to a logical channel configured with highest sl-priority among the at least one logical channel including the sidelink data available for transmission.

The selecting of the destination may include in case that the configured grant Type 1 is configured for the sidelink resources, selecting the destination which corresponds to a logical channel configured with a configuredGrantType1Allowed set to true.

The MAC PDU may not include sidelink data associated with a cast type different from the one of unicast, groupcast, and broadcast associated with the destination and sidelink data associated with another destination different from the destination.

A priority of a logical channel and a logical channel group (LCG) for a first signaling radio bearer (SRB) for PC5-S message and a priority of a logical channel and a LCG for a second SRB for PC5-RRC message may be configured with highest priority.

The first SRB and the second SRB may be configured differently.

The method may further include transmitting, to a base station, a sidelinkUEInformation message including a sidelink quality-of-service (QoS) flow identifier and a PC5 QoS identifier (PQI), wherein the sidelink logical channel configuration information is configured based on the sidelink QoS flow identifier and the PQI.

The method may further include: obtaining information of a transmission range corresponding to the logical channel; and selecting the destination which corresponds to a logical channel configured with a same transmission range as a transmission range configured for the sidelink resources.

According to an embodiment of the disclosure, a user equipment (UE) in a wireless communication system includes: a transceiver; and at least one processor operably connected with the transceiver and configured to: obtain sidelink logical channel configuration information corresponding to a logical channel and including a sidelink logical channel priority (sl-priority) parameter, select a destination associated with one of unicast, groupcast, and broadcast, based on the sidelink logical channel configuration information and sl-priority configured for each of at least one logical channel including sidelink data available for transmission, allocate sidelink resources to at least one logical channel corresponding to the destination based on the sl-priority configured for each of the at least one logical channel corresponding to the destination, multiplex sidelink data included in the at least one logical channel corresponding to the destination to a medium access control (MAC) protocol data unit (PDU), and transmit, by controlling the transceiver, the MAC PDU to another UE using the sidelink resources.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
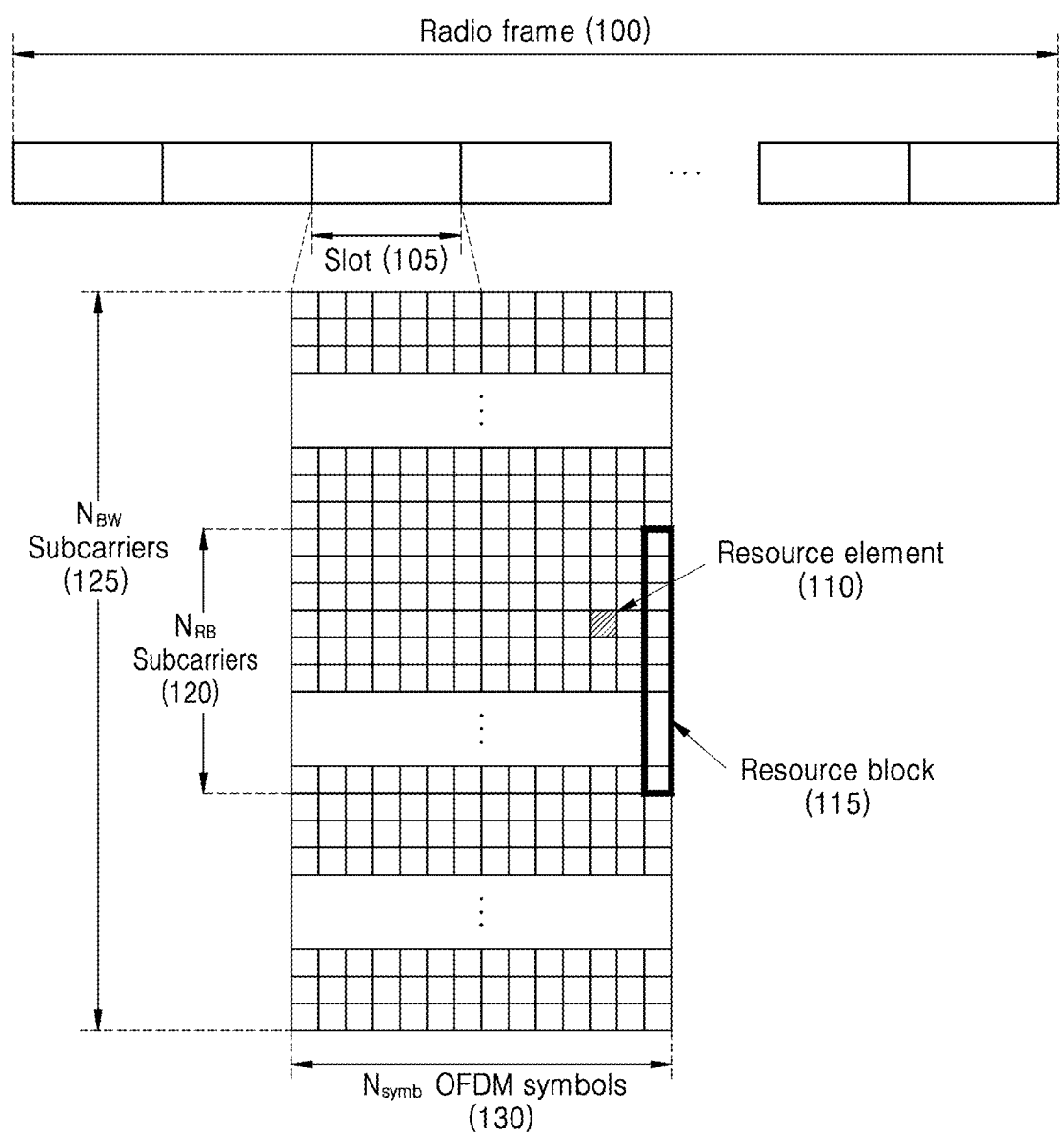
FIG. 1 is a diagram illustrating a structure of a radio time-frequency resource of a New Radio (NR) system, according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, example embodiments of the disclosure will be described in detail with reference to the accompanying drawings. In this case, it should be noted that like reference numerals denote like elements in the accompanying drawings. Also, detailed descriptions of known functions and configurations that may obscure the subject matter of the disclosure will be omitted for conciseness.

In describing the embodiments of the disclosure, descriptions of technical contents that are well known in the technical field to which the disclosure belongs and are not directly related to the disclosure will be omitted. This is to more clearly convey the subject matter of the disclosure without obscuration thereof by omitting unnecessary descriptions thereof.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

Advantages and features of the disclosure and methods of achieving the same will be apparent from the embodiments of the disclosure described below in detail with reference to the accompanying drawings. The disclosure may, however, be embodied in many different forms and should not be construed as being limited to the embodiments of the disclosure described below; rather, these embodiments of the disclosure are provided to complete the disclosure and fully convey the scope of the disclosure to those of ordinary skill in the art and the disclosure will be defined only by the scope of the claims. Like reference numerals refer to like elements throughout the specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

Also, the term "unit" used herein means a software component or a hardware component such as a field-programmable gate array (FPGA) or an application-specific integrated circuit (ASIC), and the "unit" performs some functions. However, the "~ unit" is not limited to software or hardware. The "~ unit" may be configured to be in an addressable storage medium or may be configured to operate one or more processors. Thus, as an example, the "~ unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~ units" may be associated with the smaller number of components and "~ units" or may be further divided into additional components and "~ units". In addition, the components and "~ units" may be implemented to operate one or more central processing units (CPUs) in a device or a security multimedia card.

In describing the embodiments of the disclosure in detail, the radio access network "New RAN (NR)" and the core network "Packet Core" on the 5G mobile communication standards specified by $3^{rd}$ Generation Partnership Project Long Term Evolution (3GPP LTE) that is the standardization organization for mobile communication standards (5G System, 5G Core Network, or Next Generation Core (NG Core)) are main targets; however, the main subject matter of the disclosure may also be applied to other communication systems having similar technical backgrounds with slight modifications within the range not significantly departing from the scope of the disclosure, which will be possible at the discretion of those of ordinary skill in the technical field of the disclosure.

In the 5G system, a network data collection and analysis function (NWDAF), which is a network function for providing a function of analyzing and providing data collected in the 5G network, may be defined to support network automation. The NWDAF may collect/store/analyze information from the 5G network and provide the results thereof to unspecified network functions (NFs), and the analysis result thereof may be used independently in each NF.

Hereinafter, some terms and names defined in the 3GPP standards (5G, NR, LTE, or similar system standards) may be used for convenience of description. However, the disclosure is not limited to those terms and names and may also be similarly applied to systems according to other standards.

Also, in the following description, terms for identifying access nodes, terms referring to network entities, terms referring to messages, terms referring to interfaces between network entities, terms referring to various identification information, and the like are illustrated for convenience of description. Thus, the disclosure is not limited to the terms used herein and other terms referring to objects having equivalent technical meanings may also be used.

In the case of vehicle communication, standardization work for vehicle-to-everything (V2X) technology has been completed in 3GPP Release 14 and Release 15 based on the device-to-device (D2D) communication structure in the LTE system, and efforts are currently being made to develop V2X technology based on 5G NR. NR V2X is expected to support unicast communication, groupcast (or multicast) communication, and broadcast communication between terminals. Also, unlike LTE V2X aiming to transmit/receive basic safety information required for road driving of vehicles, NR V2X aims to provide more advanced services such as platooning, advanced driving, extended sensors, and remote driving.

V2X services may be classified into basic safety services and advanced services. The basic safety services may include vehicle notification (Cooperative Awareness Message ("CAM") or Basic Safety Message ("BSM")) services and other detailed services such as left turn notification services, front vehicle collision warning services, emergency vehicle access notification services, front obstacle warning services, and intersection signal information services, and V2X information may be transmitted/received by using broadcast, unicast, or groupcast transmission methods.

In comparison with the basic safety services, the advanced services not only have enhanced QoS (Quality of Service) requirements but also require a scheme for transmitting/receiving V2X information by using the unicast and groupcast transmission methods in addition to the broadcast transmission methods in order to transmit/receive V2X information within a particular vehicle group or transmit/receive V2X information between two vehicles. The advanced services may include detailed services such as platooning services, autonomous driving services, remote driving services, and extended sensor-based V2X services.

Hereinafter, a sidelink (SL) may refer to a signal transmission/reception path between terminals, which may be mixed with a PC5 interface. Hereinafter, a base station may be an agent performing resource allocation of terminals and may be a base station supporting both V2X communication and general cellular communication or a base station supporting only V2X communication. That is, the base station may refer to an NR base station (gNB), an LTE base station (eNB), or a road site unit (RSU). The terminals may include not only general user equipments or mobile stations but also vehicles supporting vehicle-to-vehicle (V2V) communication, vehicles or pedestrian handsets (e.g., smartphones) supporting vehicle-to-pedestrian (V2P) communication, vehicles supporting vehicle-to-network (V2N) communication, vehicles supporting vehicle-to-infrastructure (V2I) communication, RSUs equipped with terminal functions, RSUs equipped with base station functions, or RSUs equipped with some base station functions and some terminal functions. Also, in the following description, a V2X terminal may be referred to as a terminal. That is, in connection with V2X communication, a terminal may be used as a V2X terminal.

The base station and the terminal may be connected through a Uu interface. An uplink (UL) may refer to a radio link through which the terminal transmits data or control signals to the base station, and a downlink (DL) may refer to a radio link through which the base station transmits data or control signals to the terminal.

FIG. 1 is a diagram illustrating a structure of a radio time-frequency resource of an NR system according to an embodiment of the disclosure.

Referring to FIG. 1, in the radio resource region, the horizontal axis represents a time domain and the vertical axis represents a frequency domain. The minimum transmission unit in the time domain may be an orthogonal frequency division multiplexing (OFDM) symbol or a discrete Fourier transform spread OFDM (DFT-S-OFDM) symbol, and $N_{symb}$ OFDM symbols or DFT-S-OFDM symbols 130 may be aggregated to constitute one slot 105. Unlike the slot, in the NR system, the length of a subframe may be defined as 1.0 millisecond (ms), and a radio frame 100 may be defined as 10 ms. The minimum transmission unit in the frequency domain may be a subcarrier, and the bandwidth of an entire system transmission band may include a total of $N_{BW}$ subcarriers 125. However, these specific values may be variably applied depending on the systems.

The basic unit of a time-frequency resource region may be a resource element (RE) 110, which may be represented by an OFDM symbol index or a DFT-S-OFDM symbol index and a subcarrier index. A resource block (RB) 115 may be defined as $N_{RB}$ consecutive subcarriers 120 in the frequency domain. In general, the minimum transmission unit of data may be an RB unit, and generally, $N_{symb}$=14 and $N_{RB}$=12 in the NR system.

The structure of the radio time-frequency resource may be applied to the Uu interface but may also be similarly applied to sidelink communication.

Figure 2A:
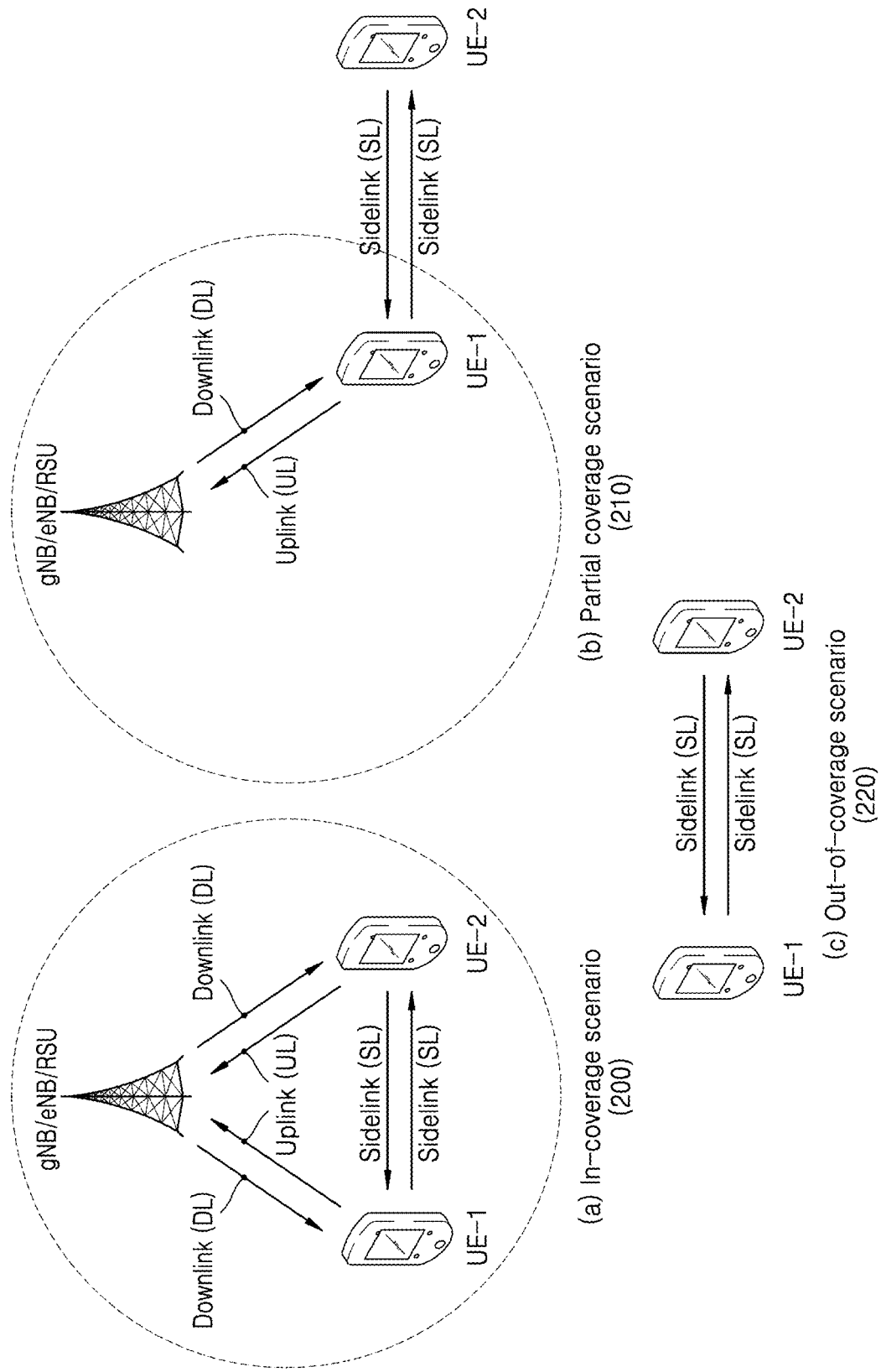
FIG. 2A is a diagram illustrating a base station's coverage of a vehicle-to-everything (V2X) system, according to an embodiment of the disclosure.

FIG. 2A is a diagram illustrating a base station's coverage of a V2X system, according to an embodiment of the disclosure.

Referring to FIG. 2A, an in-coverage scenario 200 may be a case where all V2X terminals (UE1 and UE2) are located within the coverage of a base station (gNB/eNB/RSU). In this case, the V2X terminals may receive data and control information from the base station through the downlink or may transmit data and control information to the base station through the uplink. In this case, the data and control information may be data and control information for V2X communication or data and control information for general cellular communication. Also, the V2X terminals may transmit/receive data and control information for V2X communication through the sidelink.

A partial coverage scenario 210 may be a case where UE1 among the V2X terminals is located within the coverage of the base station (gNB/eNB/RSU) and UE2 is located outside the coverage of the base station. UE1 located within the coverage of the base station may receive data and control information from the base station through the downlink or may transmit data and control information to the base station through the uplink. UE2 located outside the coverage of the base station may not receive data and control information from the base station through the downlink and may not transmit data and control information to the base station through the uplink. UE2 may transmit/receive data and control information for V2X communication to/from UE1 through the sidelink.

An out-of-coverage scenario 220 may be an example of a case where all the V2X terminals are located outside the coverage of the base station (out-of-coverage). Thus, UE1 and UE2 may not receive data and control information from the base station through the downlink and may not transmit data and control information to the base station through the uplink. UE1 and UE2 may transmit/receive data and control information for V2X communication through the sidelink.

Figure 2B:
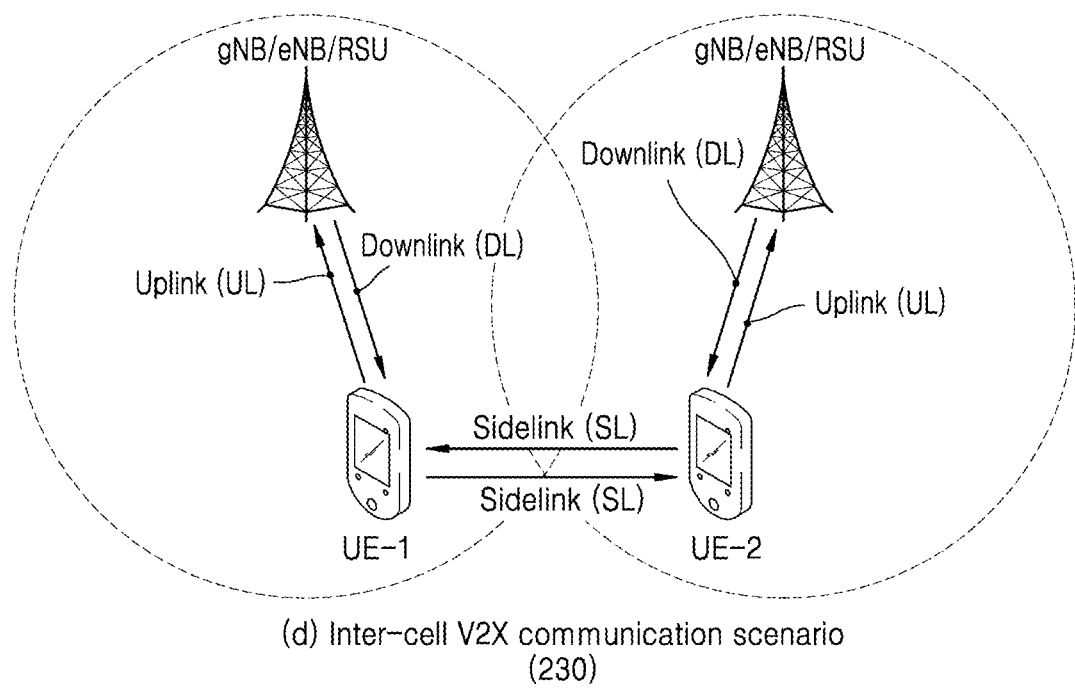
FIG. 2B is a diagram illustrating a base station's coverage of a V2X system, according to an embodiment of the disclosure.

FIG. 2B is a diagram illustrating a base station's coverage of a V2X system, according to an embodiment of the disclosure.

Referring to FIG. 2B, an inter-cell V2X communication scenario 230 may be a scenario for performing V2X communication between terminals located in different cells. Particularly, referring to FIG. 2B, a V2X transmitting terminal and a V2X receiving terminal may be connected to different base stations (an RRC connected state), may be camping (a radio resource control (RRC) idle state), or may be in an RRC inactive state. In this case, UE1 may be the V2X transmitting terminal and UE2 may be the V2X receiving terminal, or UE1 may be the V2X receiving terminal and UE2 may be the V2X transmitting terminal. With regard to feedback and operation, the V2X transmitting terminal may be a terminal transmitting physical sidelink control channel (PSCCH) or physical sidelink shared channel (PSSCH), and the V2X receiving terminal may be a terminal receiving PSCCH or PSSCH transmitted by the transmitting terminal or a terminal transmitting physical sidelink feedback channel (PSFCH) based on decoding of PSSCH transmitted by the transmitting terminal. UE1 may receive a system information block (SIB) for V2X from a base station where it is connected (or is camping), and UE2 may receive an SIB for V2X from another base station where it is connected (or is camping). In this case, the information of the SIB for V2X received by UE1 and the information of the SIB for V2X received by UE2 may be equal to or different from each other.

For convenience of description, FIGS. 2A and 2B illustrate the V2X system including two terminals (UE1 and UE2); however, the disclosure is not limited thereto and various numbers of terminals may participate in the V2X system.

Figure 3:
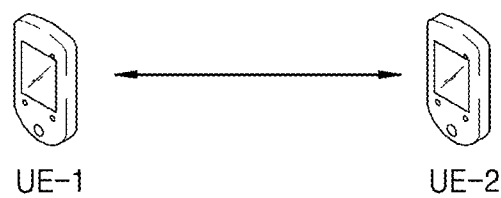
FIG. 3 is a diagram illustrating V2X communication performed through a sidelink, according to an embodiment of the disclosure.
Figure 3:
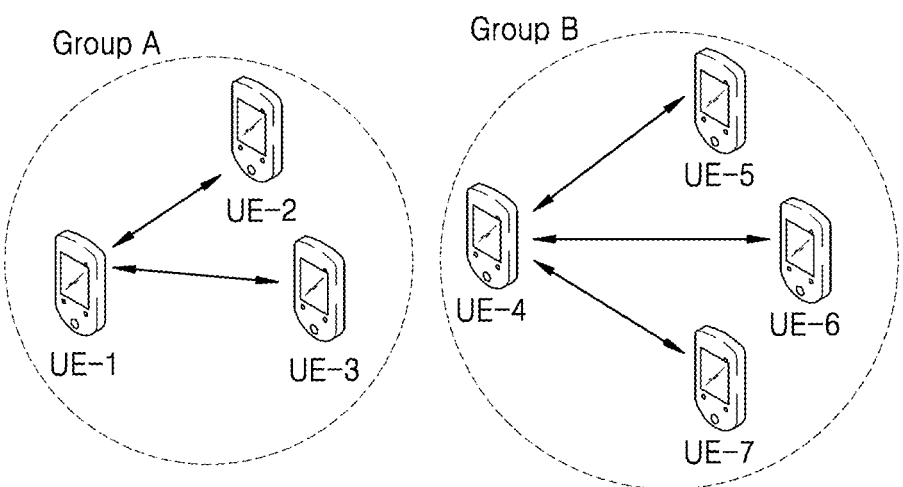

FIG. 3 is a diagram illustrating V2X communication performed through a sidelink according to an embodiment of the disclosure.

Referring to FIG. 3, unicast communication 300 may be a case where a transmitting terminal (UE1 or UE2) and a receiving terminal (UE2 or UE1) perform one-to-one communication.

Also, referring to FIG. 3, groupcast or multicast communication 310 may be a case where transmitting terminals and receiving terminals perform one-to-many communication. In the groupcast, UE1, UE2, and UE3 may form a group (group A) to perform groupcast communication, and UE4, UE5, UE6, and UE7 may form another group (group B) to perform groupcast communication. Each terminal may perform groupcast communication only within a group to which it belongs and may perform unicast, groupcast, or broadcast communication with terminals located in different groups. Although FIG. 3 illustrates an example in which two groups are formed, the disclosure is not limited thereto. Each group may include at least one terminal. Also, the terminal may belong to at least two groups.

Meanwhile, although not illustrated in FIG. 3, V2X terminals may perform broadcast communication. The broadcast communication may mean a case where all V2X terminals receive data and control information transmitted by a V2X transmitting terminal through a sidelink. For example, assuming that UE1 is a transmitting terminal for broadcast in 310, all terminals (UE2, UE3, UE4, UE5, UE6, and UE7) may receive data and control information transmitted by UE1.

Sidelink broadcast, groupcast, and unicast communication methods according to embodiments of the disclosure may be supported in in-coverage, out-of-coverage, and partial-coverage scenarios.

Unlike in LTE V2X, in NR V2X, support of a transmission mode in which a vehicle terminal transmits data to only one particular terminal through unicast and a transmission mode in which data is transmitted to a plurality of particular terminals through groupcast may be considered. For example, when considering a service scenario such as platooning that is a technology for moving two or more vehicles in a grouped manner by connecting the same through one network, unicast and groupcast technologies may be usefully used. Particularly, unicast communication may be required to control a particular terminal by a leader terminal of a group connected by platooning, and groupcast communication may be required to simultaneously control a group of a plurality of particular terminals.

Resource allocation in the V2X system may be performed as follows.

Mode 1 Resource Allocation

Scheduled resource allocation may be a method in which a base station allocates RRC-connected terminals resources used for sidelink transmission in a dedicated scheduling manner. The scheduled resource allocation method may be effective for interference management and resource pool management (dynamic allocation and/or semi-persistent transmission) because the base station may manage the resources of the sidelink. When there is data to be transmitted to other terminal(s), an RRC-connected mode terminal may transmit information notifying the base station that there is data to be transmitted to other terminal(s) by using an RRC message or a MAC control element (CE). For example, the RRC message transmitted by the terminal to the base station may be a sidelink terminal information (SidelinkUEInformation) or terminal assistance information (UEAssistanceInformation) message, and the MAC CE may be a BSR MAC CE, a scheduling request (SR), or the like including at least one of an indicator indicating a buffer status report (BSR) for V2X communication or information about the size of data buffered for sidelink communication.

Mode 2 Resource Allocation

Terminal autonomous resource selection (UE autonomous resource selection) may be a method in which a base station provides a sidelink transmission/reception resource pool for V2X to a terminal through system information or RRC message (e.g., RRC reconfiguration (RRCReconfiguration) message or PC5-RRC message) and the terminal selects a resource pool and a resource according to a given rule. The terminal autonomous resource selection may correspond to one or more of the following resource allocation methods.

UE autonomously selects sidelink resource for transmission

UE assists sidelink resource selection for other UEs

UE is configured with NR configured grant for sidelink transmission

UE schedules sidelink transmission of other UEs

The resource selection method of the terminal may include zone mapping, sensing-based resource selection, random selection, or the like.

In addition, even when a terminal is located in the coverage of a base station, resource allocation or resource selection may not be performed in a scheduled resource allocation or terminal autonomous resource selection mode, and in this case, the terminal may perform V2X sidelink communication through a pre-configured sidelink transmission/reception resource pool.

Also, when terminals for V2X communication are located outside the coverage of a base station, a terminal may perform V2X sidelink communication through a pre-configured sidelink transmission/reception resource pool.

The sidelink radio bearer (SLRB) configuration and SLRB for transmitting a sidelink flow or packet may be mapped to an SL logical channel group (SL LCG), and the SL LCG may be mapped to an SL logical channel. The SLRB configuration and SLRB may be divided into a combination of source index, destination index, cast type, QFI/PFI, priority, or the like.

Figure 4:
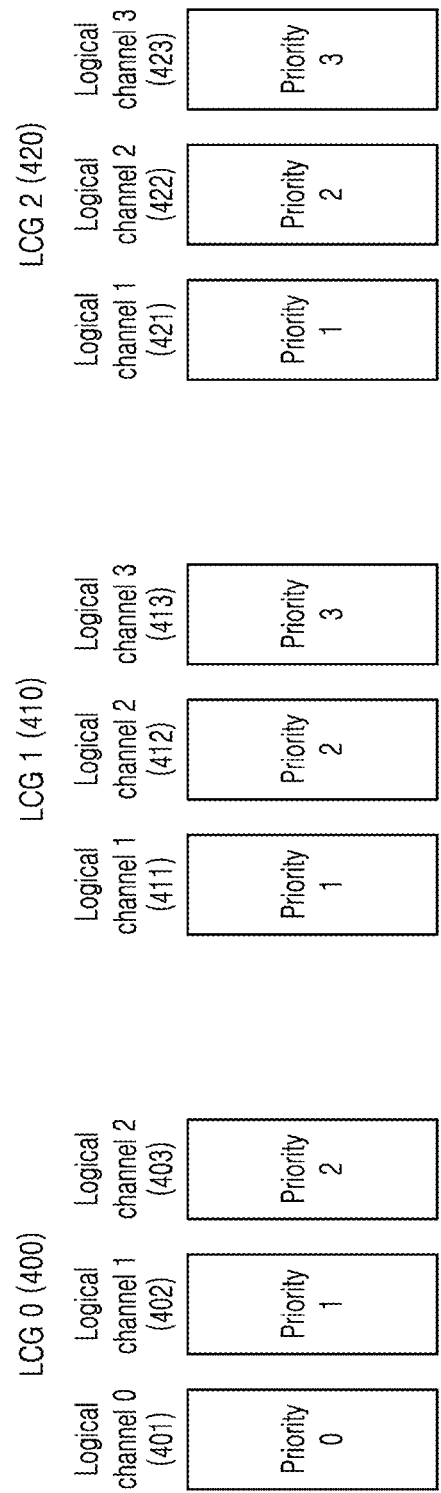
FIG. 4 illustrates an example of configuring an SL logical channel and an SL logical channel group, according to an embodiment of the disclosure.

FIG. 4 illustrates an example of configuring an SL logical channel and an SL logical channel group (SL LCG) according to an embodiment of the disclosure. Referring to FIG. 4, SL LCG0 (400) may include logical channels 0 to 2 (401, 402, and 403), SL LCG1 (410) may include logical channels 1 to 3 (411, 412, and 413), and SL LCG2 (420) may include logical channels 1 to 3 (421, 422, and 423).

The SL LCG corresponding to the SLRB configuration may be configured according to each or a combination of PQI/5QI, PFI/QFI, source index, destination index, cast type, packet type, and communication range. According to various embodiments of the disclosure, the LCG may be configured according to at least one of the following methods.

LCG may be configured based on the QoS or priority of PQI/5QI.

LCG may be configured based on PFI/QFI.

LCG may be configured based on the source index or destination index.

LCG may be configured based on the communication range.

LCG may be configured based on cast type. (configured as a separate LCG according to each or a combination of broadcast, groupcast, and unicast)

LCG may be configured based on packet type. (configured as a separate LCG according to each or a combination of PC5 RRC, PC5 Signaling, and user packet)

The SL logical channel may be configured according to each or a combination of PQI/5QI, PFI/QFI, source index, destination index, cast type, packet type, and communication range. According to various embodiments of the disclosure, the logical channel may be configured according to at least one of the following methods.

Logical channel may be configured based on the QoS or priority of PQI/5QI.

Logical channel may be configured based on PFI/QFI.

Logical channel may be configured based on the source index or destination index.

Logical channel may be configured based on cast type.

Logical channel may be configured based on packet type.

Logical channel may be configured based on communication range.

The SL LCG may be configured according to the destination index or destination index+cast type. The SL logical channel may be configured to correspond to the priority of 5QI/PQI. For example, when the priority value of PQI/5QI of the SL LCG is 1, it may be mapped to a logical channel corresponding to priority 1. The SL logical channel may be configured to correspond to the communication range. The SL logical channel may be configured to correspond to a combination of the priority and the communication range.

As another embodiment of the disclosure, the SL LCG may be configured according to the cast type. The SL logical channel may be configured to correspond to the destination index. The SL logical channel may be configured to correspond to the priority of 5QI/PQI. The SL logical channel may be configured to correspond to the communication range. The SL logical channel may be configured to correspond to a combination of at least one of the destination index, the priority, or the communication range.

As another embodiment of the SL LCG configuration, only one SL LCG may be operated. As another embodiment of the SL LCG configuration, the SL LCG may be randomly configured. The SL logical channel may be configured to correspond to the cast type. The SL logical channel may be configured to correspond to the destination index. The SL logical channel may be configured to correspond to the priority of 5QI/PQI. The SL logical channel may be configured to correspond to the communication range. The SL logical channel may be configured to correspond to a combination of at least one of the cast type, the destination index, the priority, and or communication range.

When the SL LCG or the SL logical channel is configured according to the packet type, the PC5 RRC may be configured to correspond to the LCG or the logical channel having the highest priority. For example, assuming that priority 0 is the highest priority, SL LCG0 or SL logical channel 0 corresponding to priority 0 may be configured to transmit the PC5 RRC. PC5 signaling (PC5-S) may be configured to correspond to the SL LCG or the SL logical channel having a higher priority than a user packet. As another embodiment of the disclosure, the PC5-S may be configured to correspond to the same SL LCG or SL logical channel as the PC5

RRC. As another embodiment of the disclosure, the PC5-S may be configured to the same SL LCG as the PC5 RRC but may be configured to correspond to a lower-priority SL logical channel than the PC5 RRC.

As described above, each SL logical channel may have a priority, and a priority parameter indicating the priority of an SL logical channel may be at least one or a combination of the parameters of [Table 1] below. As an embodiment of the disclosure, the priority may decrease as the priority parameter value increases. As an embodiment of the disclosure, the priority may increase as the priority parameter value increases. The same priority parameter value may be configured to one or more SL logical channels.

TABLE 1

Priority
PQI
5QI
QFI
PPPP (ProSePerPacketPriority)
PPPR (ProSePerPacketReliability)
Packet delay budget (latency)
Packet error rate (reliability)
Communication range The priority parameter mapping of the SL logical channel configuration and the priority parameter mapping for the SL logical channel may be configured according to at least one of the following embodiments of the disclosure.

(1) Pre-Configuration

The priority mapping of each SL logical channel configuration may be pre-configured in the terminal. The logical channel group ID (LCG ID) and the priority mapping may be pre-configured. The terminal may perform logical channel ID (LCD) mapping on the SL logical channel configuration based on the pre-configured information. The terminal may map the LCG ID to the LCD corresponding to the priority of the logical channel.

(2) Configuration in RRC Dedicated Signaling Transmitted by Base Station

The configuration and priority mapping information of each SL logical channel may be configured through the RRC dedicated signaling transmitted from the base station. The LCG ID and priority mapping may be configured through the RRC dedicated signaling. When the terminal is in an RRC Connected state, the configuration through the RRC dedicated signaling may be used. The SL configuration may correspond to at least one of SL unicast, SL broadcast, or SL groupcast. The terminal may perform LCID mapping on the SL logical channel configuration based on the information indicated in the RRC dedicated signaling. The terminal may map the LCG ID to the LCID corresponding to the priority of the logical channel.

(3) Configuration in SIB Signaling Transmitted by Base Station

The configuration and priority mapping information of each SL logical channel may be configured through the SIB signaling transmitted from the base station. The LCG ID and priority mapping may be configured through the SIB signaling. When the terminal is in an RRC_Idle/RRC_Inactive state, the configuration through the SIB signaling may be used. The SL configuration may correspond to at least one of SL unicast, SL groupcast, or SL broadcast. The terminal may perform LCID mapping on the SL logical channel configuration based on the information indicated in the SIB signaling. The terminal may map the LCG ID to the LCID corresponding to the priority of the logical channel.

In the above, when the terminal maps the LCID for each SL logical channel, an LCID space may be managed for each destination index. When the destination index is not classified by cast type, the LCID space may be managed for each destination index+cast type.

According to an embodiment of the disclosure, a communication range restriction may be configured on a particular SL logical channel. Also, an allocation mode restriction may be configured on a particular SL logical channel. Also, a configured grant type (CGType) restriction may be configured on a particular SL logical channel. Also, the CGType restriction may include at least one of CGType1 allowed, CGType2 allowed, CGType1 index, or CGType2 index. Also, a maximum allowed PSSCH duration restriction may be configured on a particular SL logical channel. Also, an allowed sidelink subcarrier spacing restriction may be configured on a particular SL logical channel. Also, a cast type restriction may be configured on a particular SL logical channel. A terminal operation using the restriction configuration rule on the SL logical channel described above will be described below in detail.

Figure 5:
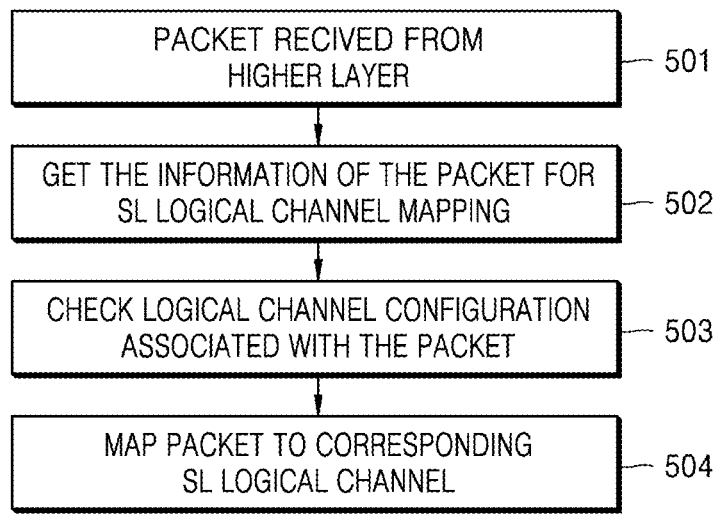
FIG. 5 is a diagram illustrating an operation of a transmitting terminal mapping a packet to an SL logical channel, according to an embodiment of the disclosure.

FIG. 5 is a diagram illustrating an operation of a transmitting terminal mapping a packet to an SL logical channel according to an embodiment of the disclosure.

Referring to FIG. 5, in operation 501, an access stratum (AS) layer of the transmitting terminal may acquire a packet from an upper layer.

In operation 502, the AS layer of the terminal may acquire information for mapping the acquired packet to an SL logical channel. The information for mapping the packet to the SL logical channel may be included in an upper layer packet or upper layer packet information. The information for mapping the packet to the SL logical channel may include at least one of source index, destination index, cast type, QoS info (at least one of PQI, PFI, 5QI, QFI, and priority), or packet type.

In operation 503, the AS layer of the terminal may check SL logical channel configuration information corresponding to the acquired packet based on the information for mapping the acquired packet to the SL logical channel.

In operation 504, based on the SL logical channel configuration information corresponding to the information of the acquired packet, the AS layer of the terminal may map the acquired packet to the corresponding SL logical channel.

An embodiment of the disclosure in which the terminal determines the SL logical channel configuration or the SL logical channel corresponding to the information of the acquired packet may be the same as the embodiment of FIG. 4 described above. For example, the terminal may map the acquired packet to the logical channel having the same destination index or PQI/5QI based on the destination index and PQI/5QI values of the packet. In another embodiment of the disclosure, the terminal may map the acquired packet to the logical channel having the same destination index, PQI/5QI, or communication range value based on the destination index, PQI/5QI, and communication range value of the packet. When there is no SL logical channel configuration corresponding to the information of the packet described above, the terminal may perform a procedure for setting the SL logical channel configuration required for packet transmission. In the SL logical channel configuration setting procedure, pre-configured information or signaling with the base station may be used.

After operation 504, the terminal may transmit a secured SL grant through a packet by using a logical channel prioritization procedure according to an embodiment of the disclosure.

Figure 6:
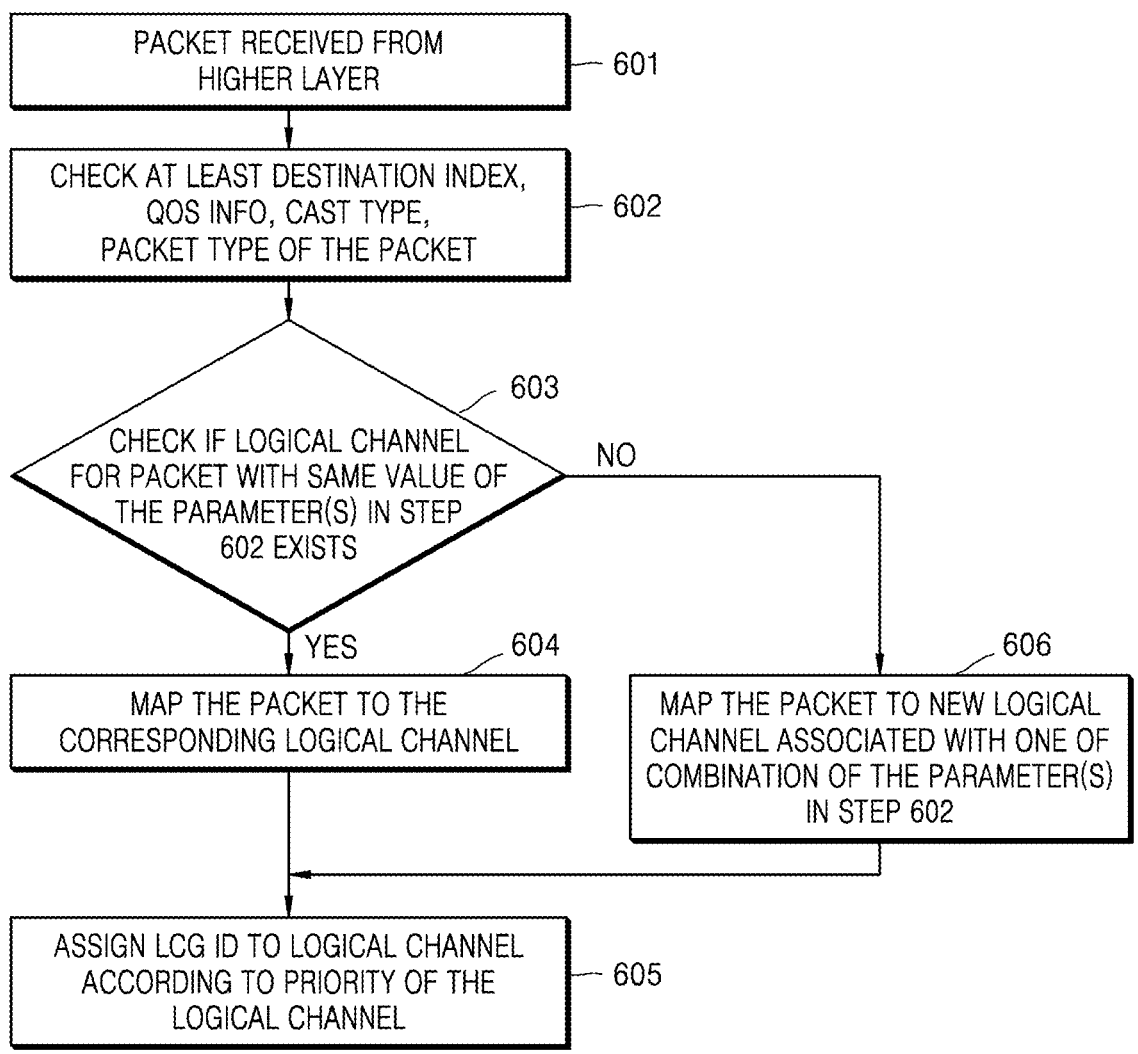
FIG. 6 is a diagram illustrating an operation of a transmitting terminal mapping a packet to an SL logical channel, according to another embodiment of the disclosure.

FIG. 6 is a diagram illustrating an operation of a transmitting terminal mapping a packet to an SL logical channel according to an embodiment of the disclosure.

Referring to FIG. 6, in operation 601, an AS layer of the transmitting terminal may acquire a packet from an upper layer.

In operation 602, the AS layer of the terminal may acquire information for mapping the acquired packet to an SL logical channel. The information for mapping the packet to the SL logical channel may be included in an upper layer packet or upper layer packet information. The information for mapping the packet to the SL logical channel may include at least one of source index, destination index, cast type, QoS info (at least one of PQI, PFI, 5QI, QFI, and priority), or packet type.

In operation 603, the AS layer of the terminal may determine whether an SL logical channel for mapping the acquired packet is configured based on the information for mapping the acquired packet to the SL logical channel.

In operation 604, when the SL logical channel for mapping the packet is configured, the AS layer of the terminal may map the acquired packet to the corresponding SL logical channel.

An embodiment of the disclosure in which the terminal determines the SL logical channel corresponding to the information of the acquired packet may be the same as the embodiment of FIG. 4 described above. For example, the terminal may map the acquired packet to the SL logical channel corresponding to at least one or a combination of the destination index, QoS info, cast type, and packet type of the packet.

In operation 606, when it is determined that the SL logical channel for mapping the packet is not configured, the AS layer of the terminal may newly configure an SL logical channel corresponding to the acquired packet. The newly-configured SL logical channel may correspond to at least one or a combination of the packet destination index, QoS info, cast type, and packet type of the packet.

Thereafter, in operation 605, the AS layer of the terminal may allocate an LCG ID to the logical channel based on the priority information of the SL logical channel to which the acquired packet is mapped. After operation 605, the terminal may transmit the packet through a secured SL grant by using a logical channel prioritization procedure according to an embodiment of the disclosure.

Figure 7:
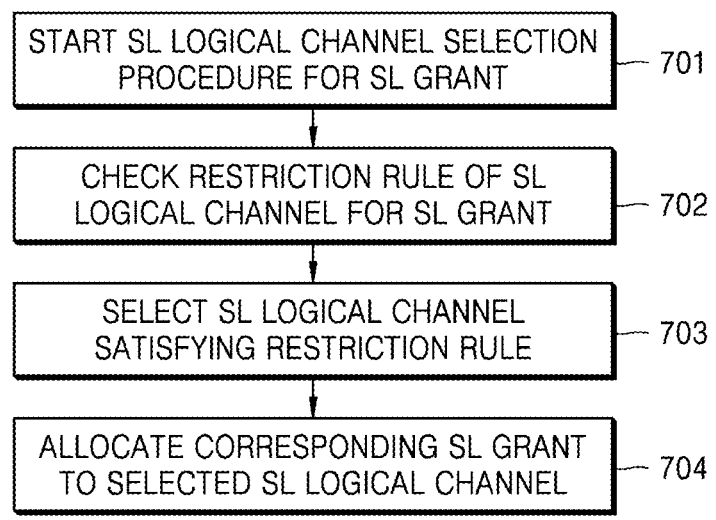
FIG. 7 is a diagram illustrating an operation of a transmitting terminal allocating an SL grant to an SL logical channel, according to an embodiment of the disclosure.

FIG. 7 is a diagram illustrating an operation of a transmitting terminal according to an embodiment of the disclosure.

A sidelink MAC entity may perform a logical channel prioritization (LCP) procedure for new transmission. The LCP may be applied to any transmission type among broadcast, groupcast, or unicast. The LCP may be performed for new transmission corresponding to each sidelink control information (SCI).

The sidelink MAC entity may select an SL logical channel satisfying a logical channel restriction rule for each SL grant. Logical channel restriction rule configuration information may be as follows.

- allowedSLSCS-List which sets the allowed Sidelink Subcarrier Spacing(s) for transmission;
- maxPSSCH-Duration which sets the maximum PSSCH duration allowed for transmission;
- configuredGrantType1Allowed which sets whether a configured grant Type 1 can be used for transmission;
- configuredGrantType2Alloed which sets whether a configured grant Type 2 can be used for transmission;
- configuredGrantType1AllowedIndex which sets the allowed configured grant Type 1 index for transmission;
- configuredGrantType2AllowedIndex which sets the allowed configured grant Type 2 index for transmission;
- allowedResourceAllocMode which sets the allowed resource allocation mode for transmission;
- allowedCastType which sets the allowed cast type for transmission;
- allowedCommRange which sets the allowed communication range for transmission;

The above logical channel restriction rule may be transmitted to the terminal through an RRC control message or an SIB message transmitted by the base station or may be pre-configured in the terminal and may be configured for each sidelink logical channel. An example of a message IE including the above logical channel restriction rule configuration information is illustrated in [Table 2] below.

TABLE 2

```
LogicalChannelConfig ::=    SEQUENCE (
    sl-SpecificParameters    SEQUENCE {
       priority slPriority,
       prioritisedBitRate ENUMERATED {kBps0, kBps8, kBps16, kBps32, kBps64, kBps128, kBps256, kBps512, kBps1024,
kBps2048, kBps4096, kBps8192, kBps16384, kBps32768, kBps65536, infinity}  OPTIONAL,
       bucketSizeDuration       ENUMERATED {ms5, ms10, ms20, ms50, ms100, ms150, ms300, ms500, ms1000, spare7,
spare6, spare5, spare4, spare3, spare2, spare1}  OPTIONAL,
       allowedServingCells    SEQUENCE (SIZE (1..maxNrofServingCells-1)) OF ServCellIndex   OPTIONAL,
    allowedSLSCS-List SEQUENCE (SIZE (1..maxSLSCSs)) OF SubcarrierSpacing   OPTIONAL,
    maxPSSCH-Duration   ENUMERATED { ms0p02, ms0p04, ms0p0625, ms0p125, ms0p25, ms0p5, spare2, spare1 }
OPTIONAL,
       configuredGrantType1Allowed ENUMERATED {true}           OPTIONAL,
       configuredGrantType2Allowed    ENUMERATED {true} OPTIONAL,
       configuredGrantType1AllowedIndex    (SIZE (1..maxNrofCGType1Index-1)) OF CGType1Index  OPTIONAL,
       configuredGrantType2AllowedIndex    (SIZE (1..maxNrofCGType2Index-1)) OF CGType2Index  OPTIONAL,
       allowedResourceAllocMode    ENUMERATED {model, mode2, spare3, spare2, spare1}     OPTIONAL
       allowedCastType       ENUMERATED {broadcast, groupcast, unicast}        OPTIONAL,
       allowedCommRange   ENUMERATED {range1, range2, range3, range4,...} OPTIONAL
       logicalChannelGroup INTEGER (0..maxLCG-ID)                 OPTIONAL,  -- Need R
       schedulingRequestID SchedulingRequestId                    OPTIONAL,  -- Need R
    ...,
    } OPTIONAL,   -- Cond SL
    ...
}
slPriority := INTEGER (1..8)
```

A method in which the MAC entity selects a sidelink logical channel for each SL grant to perform new packet transmission may correspond to each or a combination of the following methods.

the set of allowed Sidelink Subcarrier Spacing index values in allowedSLSCS-List, if configured, includes the Sidelink Subcarrier Spacing index associated to the SL grant;

maxPSSCH-Duration, if configured, is larger than or equal to the PSSCH transmission duration associated to the SL grant;

configuredGrantType1Allowed, if configured, is set to true in case the SL grant is a Configured Grant Type 1;

configuredGrantType1AllowedIndex, if configured, includes the Configured Grant Type 1 index associated to the SL grant;

configuredGrantType2Allowed, if configured, is set to true in case the SL grant is a Configured Grant Type 2;

configuredGrantType2AllowedIndex, if configured, includes the Configured Grant Type 2 index associated to the SL grant;

allowedResourceAllocMode, if configured, includes the allowed Resource Allocation Mode to the SL grant, here the Resource allocation mode can be either base station scheduling mode or UE scheduling mode or both;

allowedCastType, if configured, includes the cast type to the SL grant, here the cast type can be one of broadcast, groupcast, or unicast;

allowedCommRange, if configured, includes the communication range to the SL grant, here the communication range can be set as an index of corresponding distance, RSRP etc. or an absolute value of distance, RSRP etc. or a relative value of distance, RSRP etc.;

In operation 701, the terminal may start an SL logical channel selection procedure for the SL grant.

In operation 702, the terminal may determine whether a restriction rule for SL grant is configured for each SL logical channel.

In operation 703, the terminal may select an SL logical channel satisfying the restriction rule configured for the SL logical channel. The terminal may not select an SL logical channel failing to satisfy the restriction rule.

In operation 704, the terminal may perform a procedure of allocating the SL grant corresponding to the SL logical channel selected in operation 703. When it is determined in operation 702 that the restriction rule is not configured, the terminal may perform operation 704 without performing operation 703. The procedure in which the terminal allocates the SL grant for the selected SL logical channel in operation 704 will be described with reference to an embodiment of the disclosure described below.

The sidelink MAC entity may allocate a resource to a sidelink logical channel according to various embodiments of the disclosure described below. As an embodiment of the disclosure, when the restriction rule is configured as described above, a procedure of allocating a resource to a sidelink logical channel may be performed only on a logical channel satisfying the restriction rule. As another embodiment of the disclosure, a procedure of allocating a resource to a sidelink logical channel may be performed on all logical channels when the restriction rule is not configured.

The terminal may select sidelink logical channels that have not been previously selected and have packets to be transmitted in this sidelink control period (SC period). An embodiment of selecting the logical channel may be the same as at least one or a combination of the following embodiments of the disclosure.

(Option 1)

Operation 0: The terminal may select a destination index corresponding to the highest-priority logical channel among the sidelink logical channels with a packet to be transmitted. The priority of the logical channel may be determined by [Table 1] described above.

For each MAC PDU corresponding to the same SCI,

Operation 1: The terminal may allocate a resource to the sidelink logical channel having the highest priority among the sidelink logical channels corresponding to the selected destination index and having a packet to be transmitted.

Operation 2: When resources remain, the terminal may allocate the remaining resources in the order of high priority to low priority for the sidelink logical channel corresponding to the selected destination index. Operation 2 may be performed until there are no more packets to be transmitted in the sidelink logical channel or there are no remaining resources.

(Option 2)

Operation 0: The terminal may select the highest-priority logical channel among the sidelink logical channels with a packet to be transmitted. The priority of the logical channel may be determined by [Table 1] described above.

For each MAC PDU corresponding to the same SCI,

Operation 1: The terminal may allocate a resource to the sidelink logical channel having the highest priority among the sidelink logical channels with a packet to be transmitted.

Operation 2: When resources remain, the terminal may allocate the remaining resources in the order of high priority to low priority for the sidelink logical channel. Operation 2 may be performed until there are no more packets to be transmitted in the sidelink logical channel or there are no remaining resources.

(Option 3)

Operation 0: The terminal may select the logical channel having the highest priority for a combination of destination index+cast type among the sidelink logical channels with a packet to be transmitted. For example, the terminal may select a combination of destination index+cast type corresponding to the logical channel having the highest priority among the sidelink logical channels with a packet to be transmitted. The terminal may select at least one sidelink logical channel corresponding to the combination of the selected destination index+cast type and including a packet to be transmitted. The priority of the logical channel may be determined by [Table 1] described above.

For each MAC PDU corresponding to the same SCI,

Operation 1: The terminal may allocate a resource to the sidelink logical channel having the highest priority among the sidelink logical channels corresponding to the selected destination index+cast type and having a packet to be transmitted.

Operation 2: When resources remain, the terminal may allocate the remaining resources in the order of high priority to low priority for the sidelink logical channel corresponding to the selected destination index+cast type. Operation 2 may be performed until there are no more packets to be transmitted in the sidelink logical channel or there are no remaining resources.

(Option 4)

Operation 0: The terminal may select the logical channel having the highest priority for a combination of destination index+communication range among the sidelink logical channels with a packet to be transmitted. The priority of the logical channel may be determined by [Table 1].

For each MAC PDU corresponding to the same SCI,

Operation 1: The terminal may allocate a resource to the sidelink logical channel having the highest priority among the sidelink logical channels corresponding to the selected destination index+communication range and having a packet to be transmitted.

Operation 2: When resources remain, the terminal may allocate the remaining resources in the order of high priority to low priority for the sidelink logical channel corresponding to the selected destination index+communication range. Operation 2 may be performed until there are no more packets to be transmitted in the sidelink logical channel or there are no remaining resources.

The rules to be additionally followed by the terminal performing the above sidelink scheduling procedure may include the following.

When the entire service data unit (SDU) may be transmitted in the remaining resources of the corresponding MAC entity (or when a portion of the SDU may be transmitted or a retransmission RLC protocol data unit (PDU) may be transmitted), the terminal may not perform segmentation on an RLC SDU or a partially transmitted SDU.

When the terminal performs segmentation on the RLC SDU corresponding to the SL logical channel, the terminal should perform the segmentation such that the SL resource of the corresponding MAC entity may be maximally used.

The terminal should transmit as much data as possible.

When the MAC entity is allocated a SL resource equal to or greater than certain bytes and there is data to be transmitted, the MAC entity should not transmit only a padding BSR or padding.

Next, a method of configuring the priority between a sidelink and a Uu link according to various embodiments of the disclosure will be described.

When the terminal has a packet to be transmitted through the sidelink and a packet to be transmitted through the Uu link at a particular moment, when it is difficult for the terminal to simultaneously transmit the sidelink packet and the Uu link packet, the order of transmitting the sidelink packet or the Uu link packet may be configured to the terminal.

As an embodiment of the disclosure, a condition in which the sidelink packet may be preferentially transmitted over the Uu link packet may include the following.

(1) When the MAC entity of the terminal may not simultaneously transmit the packets of the respective link at the time of transmission of all Uu link packets and all sidelink packets;

(2) When the transmission priority of the Uu link packet is low;

(3) When a priority threshold value for sidelink transmission is configured and the highest priority value of the SL logical channel included in the MAC PDU is lower than the priority threshold value (assuming that the priority increases as the priority value decreases);

In the case of (3), the priority threshold value for SL unicast, SL groupcast, or SL broadcast may be separately configured, and the priority threshold value may be configured based on the priority parameter of an SL flow or an SL packet (at least one of VQI/PQI/PFI/PPPP/Priority).

In addition to (1) to (3), the priority configuration of the Uu link and the sidelink may include at least one of the following.

BSR transmitted through Uu link has higher priority than BSR transmitted through SL link.

PC5 RRC has higher priority than user packet of Uu link or SL link.

FIGS. 8A, 8B, 8C, 8D, and 8E are diagrams illustrating processing of a sidelink packet according to an embodiment of the disclosure. Referring to FIGS. 8A, 8B, 8C, 8D, and 8E, a packet that may be transmitted/received through a protocol stack of a sidelink may include at least one of PC5 RRC, PC5-S, or PC5 user packet. In the embodiment of 8a, 8b, 8c, 8d, and 8e, a description of a PHY layer located under a MAC sublayer will be omitted.

Figure 8A:
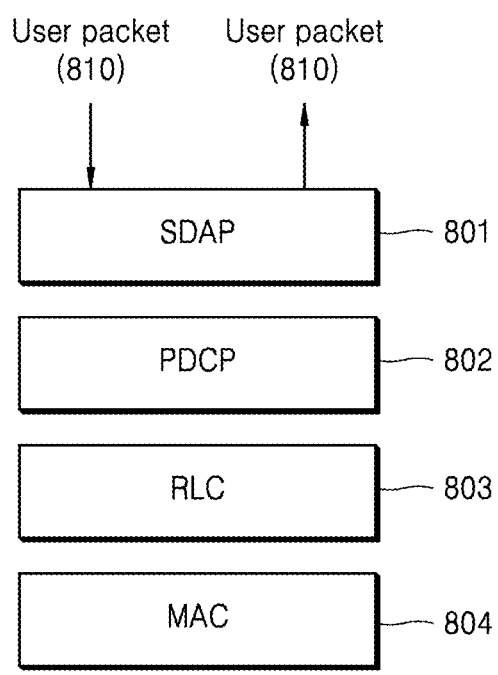
FIG. 8A is a diagram illustrating processing of a sidelink packet according to an embodiment of the disclosure.
Figure 8B:
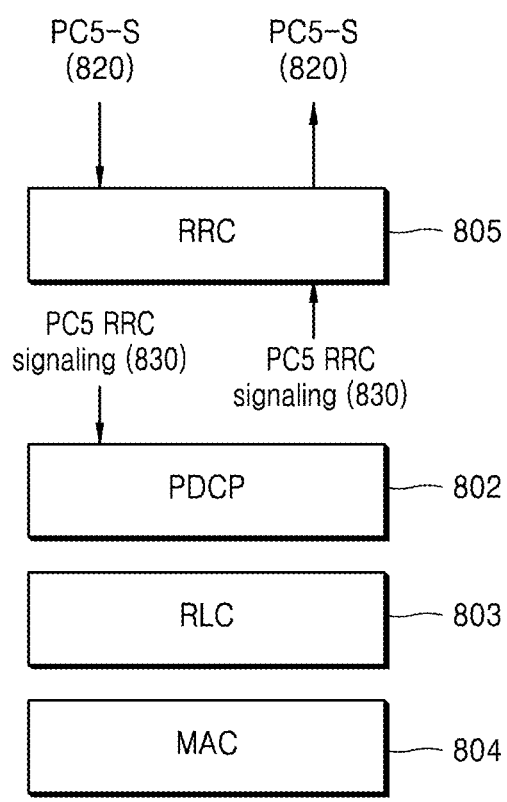
FIG. 8B is a diagram illustrating processing of a sidelink packet according to another embodiment of the disclosure.

In the embodiment of FIGS. 8A and 8B, the PC5-S packet and the PC5-RRC packet may be operated in a signaling bearer, or the PC5-S packet may be operated in a data bearer and the PC5-RRC packet may be operated in a signaling bearer but the PC5-S packet may be encapsulated in the PC5-RRC packet.

FIG. 8A illustrates an embodiment of a protocol stack that may be applied to an SL user packet. A user packet 810 may be operated in a data bearer. The user packet 810 may be processed and transmitted/received through an SDAP sublayer 801, a PDCP sublayer 802, an RLC sublayer 803, and a MAC sublayer 804.

FIG. 8B illustrates an embodiment of a protocol stack that may be applied to PC5-S and PC5-RRC. A PC5-S packet 820 may be generated and processed in an upper layer of a transmitting terminal and transmitted to PDCP, RLC, and MAC sublayers 802, 803, and 804 through an RRC layer 805. The PC5-S packet 820 may be transmitted and processed from the RRC layer 805 to the upper layer through the MAC, RLC, and PDCP sublayers 804, 803, and 802 of a receiving terminal. A PC5-RRC packet 830 may be generated in the RRC layer 805 of the transmitting terminal and transmitted to the PDCP, RLC, and MAC sublayers 802, 803, and 804. The PC5-RRC packet 830 may be transmitted and processed from the MAC, RLC, and PDCP sublayers 804, 803, and 802 of the receiving terminal to the RRC layer 805.

Figure 8C:
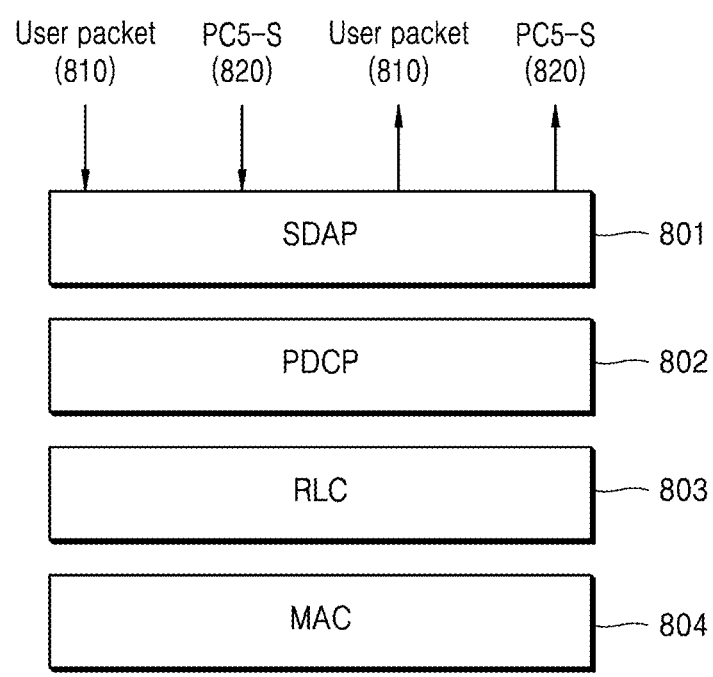
FIG. 8C is a diagram illustrating processing of a sidelink packet according to another embodiment of the disclosure.
Figure 8D:
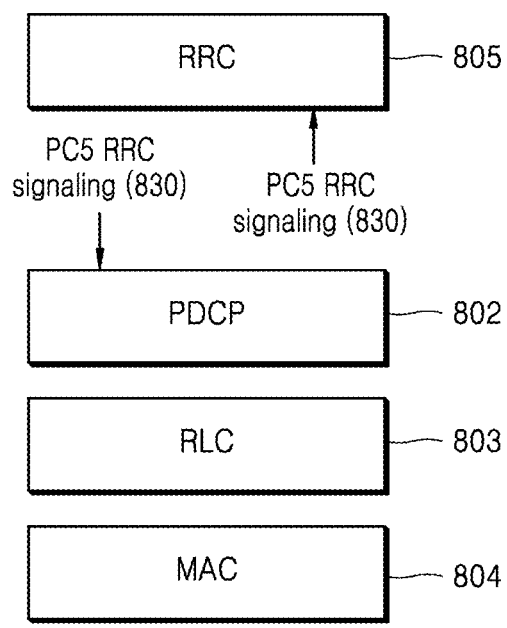
FIG. 8D is a diagram illustrating processing of a sidelink packet according to another embodiment of the disclosure.

In the embodiment of FIGS. 8C and 8D, a PC5-RRC packet may be operated in a signaling bearer and a PC5-S packet may be operated in a data bearer.

FIG. 8C illustrates an embodiment of a protocol stack that may be applied to an SL user packet and a PC5-S packet. A user packet 810 may be operated in a data bearer. The user packet 810 may be processed and transmitted/received through an SDAP sublayer 801, a PDCP sublayer 802, an RLC sublayer 803, and a MAC sublayer 804. A PC5-S packet 820 may be generated and processed in an upper layer of a transmitting terminal, transmitted to the SDAP sublayer 801, and processed and transmitted through the PDCP, RLC, and MAC sublayers 802, 803, and 804. The PC5-S packet 820 may be transmitted and processed from the MAC, RLC, and PDCP sublayers 804, 803, and 802 and the SDAP sublayer 801 of a receiving terminal to the upper layer.

FIG. 8D illustrates an embodiment of a protocol stack that may be applied to PC5-RRC. A PC5-RRC packet 830 may be generated in the RRC layer 805 of the transmitting terminal and transmitted to the PDCP, RLC, and MAC sublayers 802, 803, and 804. The PC5-RRC packet 830 may be transmitted and processed from the MAC, RLC, and PDCP sublayers 804, 803, and 802 of the receiving terminal to the RRC layer 805.

Figure 8E:
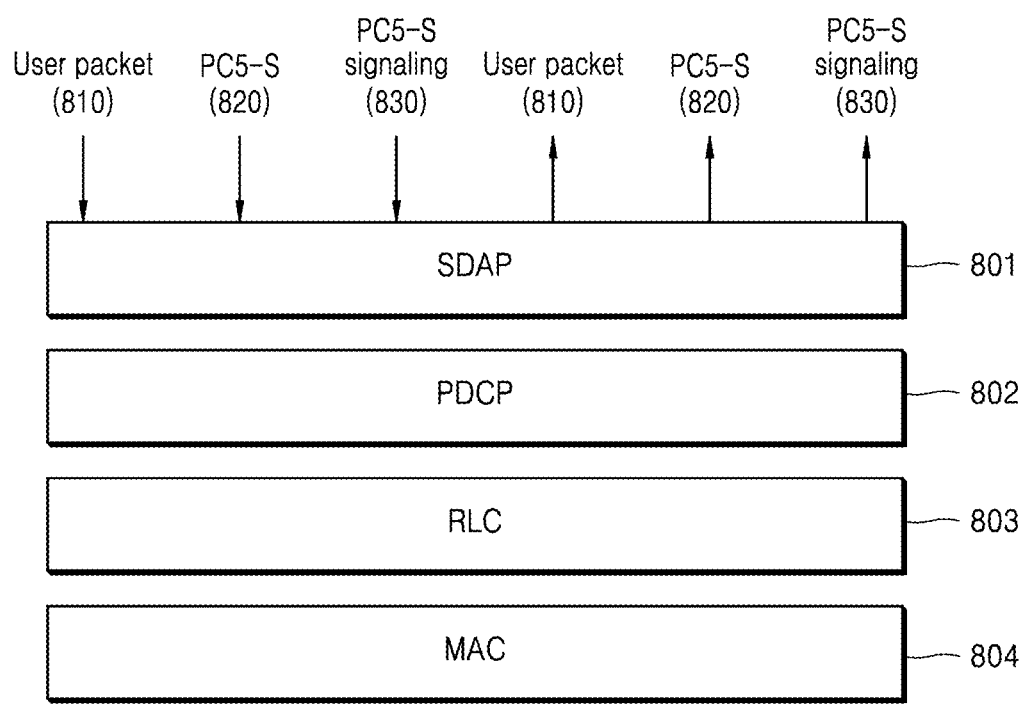
FIG. 8E is a diagram illustrating processing of a sidelink packet according to another embodiment of the disclosure.

In the embodiment of FIG. 8E, a PC5-RRC packet and a PC5-S packet may be operated in a data bearer. Here, a case where the PC5-RRC packet encapsulates the PC5-S packet may also be considered.

A user packet 810 may be operated in a data bearer. The user packet 810 may be processed and transmitted/received through an SDAP sublayer 801, a PDCP sublayer 802, an RLC sublayer 803, and a MAC sublayer 804. A PC5-S packet 820 may be generated and processed in an upper layer of a transmitting terminal, transmitted to the SDAP sublayer 801, and processed and transmitted through the PDCP, RLC, and MAC sublayers 802, 803, and 804. The PC5-S packet 820 may be transmitted and processed from the MAC, RLC, and PDCP sublayers 804, 803, and 802 and the SDAP sublayer 801 of a receiving terminal to the upper layer. A PC5-RRC packet 830 may be generated and processed in the upper layer (RRC layer) of the transmitting terminal, transmitted to the SDAP sublayer 801, and processed and transmitted through the PDCP, RLC, and MAC sublayers 802, 803, and 804. The PC5-RRC packet 830 may be transmitted and processed from the MAC, RLC, and PDCP sublayers 804, 803, and 802 and the SDAP sublayer 801 of the receiving terminal to the upper layer (RRC layer).

Next, an example of configuring the priority of a PC5 RRC packet according to various embodiments of the disclosure will be described.

(1) Method of configuring SL Signaling channel for PC5 RRC

According to an embodiment of the disclosure, a side link signaling radio bearer (SL SRB) may be configured for PC5 RRC. One or more SL SRBs may be configured for PC5 RRC. When two or more SL SRBs are configured for PC5 RRC, each SL SRB may be mapped to a different priority. For example, one SL SRB among two SL SRBs may be mapped to have a higher priority than a DRB, and the other SL SRB may be mapped to have a lower priority than some DRBs. For example, one SL SRB among two SL SRBs may be configured for PC5 RRC, and the other SL SRB may be configured for PC5-S. The priority of the SL SRB may be pre-configured regardless of the number of SL SRBs.

The PC5 RRC may be operated for each destination index for the SL unicast type.

When the PC5 RRC is mapped to the SL SRB, a PDCP SDU type for the PC5 RRC may not need to be defined.

(2) Method of Configuring SL Data Channel for PC5 RRC

According to an embodiment of the disclosure, a SL DRB different from a normal user packet may be configured for PC5 RRC. A LCID value of the SL DRB corresponding to the PC5 RRC may be pre-configured. For example, the LCID value may be defined as 0. For the packets belonging to the same destination index, an LCP rule may be configured such that the PC5 RRC may have the highest priority.

According to another embodiment of the disclosure, the same SL DRB as the normal user packet may be configured for PC5 RRC. In this case, for the packets belonging to the same destination index, an SL DRB may be configured such that the PC5 RRC may have the highest priority. When an SL DRB having a higher priority than the previously-configured SL DRB is newly configured, the PC5 RRC may be re-mapped to the newly-configured SL DRB and the LCP rule configured to have the highest priority may be maintained.

When the PC5 RRC is mapped to the SL DRB, the PDCP SDU type may be configured to at least one of the following.

When the PC5 RRC is mapped to the SL DRB, the PC5 RRC may be transmitted/received without an SDAP header.

TABLE 3

| Bit | Description |
|---|---|
| 000 | IP |
| 001 | ARP |
| 010 | PC5-S |
| 011 | Non-IP |
| 100 | PC5 RRC |
| 101-111 | reserved |

[Table 3] may be an example of using a "PC5 RRC" of a PDCP SDU type. The transmitting terminal may configure a PC5 RRC of a PDCP SDU type to inform that a PC5 RRC packet is transmitted.

As another embodiment of [Table 3], when an integrity function and/or a ciphering function is applied to the PC5 RRC, a separate PDCP SDU type may be defined to indicate the PC5 RRC to which each function is applied. For example, the PDCP SDU type may indicate "PC5-RRC w/o integrity and w/o ciphering", "PC5-RRC w/integrity and w/o ciphering", "PC5-RRC w/o integrity and w/ciphering", or "PC5-RRC w/integrity and w/ciphering".

According to an embodiment of the disclosure, when the PC5-RRC packet encapsulates the PC5-S packet, the PDCP SDU type may be configured as the PC5-RRC and the LCP rule may be configured to follow the LCP rule for the PC5-RRC.

According to another embodiment of the disclosure, when the PC5-RRC packet encapsulates the PC5-S packet, the PDCP SDU type may be configured as the PC5-S and the LCP rule may be configured to follow the LCP rule for the PC5-S.

TABLE 4

| Bit | Description |
|---|---|
| 000 | IP |
| 001 | ARP |
| 010 | PC5 Signaling |
| 011 | Non-IP |
| 100-111 | reserved |

[Table 4] may be an example of using a "PC5 Signaling" of a PDCP SDU type for PC5 RRC or PC5-S. The transmitting terminal may configure the PC5 Signaling in the PDCP SDU type to inform that the PC5 RRC or PC5-S is transmitted.

As another embodiment of [Table 4], when an integrity function and/or a ciphering function is applied to the PC5 signaling, a separate PDCP SDU type may be defined to indicate the PC5 signaling to which each function is applied. For example, the PDCP SDU type may indicate "PC5 Signaling w/o integrity and w/o ciphering", "PC5 Signaling w/integrity and w/o ciphering", "PC5 Signaling w/o integrity and w/ciphering", or "PC5 Signaling w/integrity and w/ciphering".

According to an embodiment of the disclosure, when the PC5-RRC packet encapsulates the PC5-S packet, the PDCP SDU type may be configured as the PC5 signaling and the LCP rule may be configured to follow the LCP rule for the PC5 signaling. Here, the same LCP priority may be applied to the PC5-S and the PC5-RRC.

Next, an example of configuring the priority of a PC5-S packet according to various embodiments of the disclosure will be described.

(1) Method of Configuring SL Signaling Channel for PC5-S

According to an embodiment of the disclosure, the PC5-S may be configured in the same SRB as the PC5-RRC or in a separate SRB. When the PC5-S is configured in a separate SRB from the SRB of the PC5-RRC, the PC5-RRC may have a higher priority than the PC5-S. When the PC5-S is encapsulated in the PC5-RRC, the LCP configuration for the SL signaling channel of the PC5-RRC including the PC5-S may follow the LCP rule of the PC5-RRC or may follow the LCP rule of the PC5-S.

(2) Method of Configuring SL Data Channel for PC5-S

According to an embodiment of the disclosure, an SL DRB for the PC5-S may be defined separately from an SL user packet. When the PC5-S and the PC5-RRC are mapped to the SL DRB, the SL DRB for the PC5-S may be defined separately from the PC5-RRC. When the PC5-S and the PC5-RRC are mapped to the SL DRB, the same SL DRB may be defined for the PC5-S and the PC5-RRC. When the PC5-S and the PC5-RRC are mapped to the SL DRB, the SL DRB identical to the SL user packet may be defined for the PC5-S and a separate SL DRB may be defined for the PC5-RRC. When the same SL DRB as the SL user packet is defined for the PC5-S, the same RB may be used for the SL user packet and the PC5-S used to configure the SL flow to which the SL user packet correspond.

The priority for applying logical channel prioritization (LCP) for the PC5-S packet may be configured in the same way as the PC5-RRC. When the priority different from the PC5-RRC is configured for the PC5-S packet, the priority of the PC5-S may be pre-designated. When the priority different from the PC5-RRC is configured for the PC5-S packet, the priority of the PC5-S may be designated as the priority of the SL flow configured through the PC5-S.

As an embodiment of configuring the LCID of the PC5-S, the LCID of the PC5-S may be designated as the same LCID as the PC5-RRC. As another embodiment of the disclosure, the LCID of the PC5-S may be designated in the same way as the LCID mapped to the SL flow (QFI or PFI) configured through the PC5-S. As another embodiment of the disclosure, the LCID of the PC5-S may be designated as a different LCID than the PC5-RRC and the user packet. In this case, the LCID pool for the PC5-S may be configured.

Next, various embodiments of SL packet multiplexing will be described.

According to an embodiment of the disclosure, only packets belonging to the same destination index may be multiplexed in the same MAC PDU. Packets belonging to different cast types may not be multiplexed in the same MAC PDU. Packets belonging to different resource allocation modes may not be multiplexed in the same MAC PDU.

Packets belonging to different communication ranges may not be multiplexed in the same MAC PDU. As another embodiment of the disclosure, packets not corresponding to a designated communication range may not be multiplexed in the same MAC PDU. In this case, an indicator indicating whether to transmit HARQ ACK/NAK for packets belonging to the same MAC PDU may be included in the header or subheader of the MAC PDU. Packets belonging to different communication ranges may be transmitted through different RBs. Packets not belonging to a designated communication range may be transmitted through different RBs.

When both of mode 1 (the mode of scheduling by the base station) and mode 2 (the mode of scheduling by the terminal) are designated for the SL allocation mode, the transmission resources of mode 1 and mode 2 may be simultaneously scheduled; however, when the terminal may not simultaneously transmit the transmission resources of mode 1 and mode 2, the terminal may first transmit the packet by using the resource of the mode designated in the SL flow or the high-priority packet based on the priority of the SL flow or the SL packet. When the priorities of the SL flow and the SL packet to use the transmission resources of Mode 1 and Mode 2 are equal to each other, the terminal may determine which mode of resource will be used to first transmit the packet. When both Mode 1 and Mode 2 are configured, a power scaling rule may be determined by the terminal for itself. The terminal may configure whether to use mode1 and/or mode2 for the SL flow or the SL packet, which may be configured through PFI/5QI/QFI/PQI to allocation mode mapping in an SLRB configuration setting procedure (pre-configuration or signaling of the base station).

Next, a method of operating an SL resource pool according to various embodiments of the disclosure will be described. No or one or more SL resource pool may be operated for one SL carrier and/or one SL bandwidth part (BWP). The SL resource pool may be operated according to at least one or a combination of the following configurations.

(1) Different SL resource pool for each cast type
(2) Different SL resource pool for each allocation mode
(3) Different SL resource pool for each communication range (operation according to a particular communication range or a certain communication range)
(4) Different SL resource pool depending on whether HARQ feedback is transmitted (configured to transmit HARQ feedback when a packet is transmitted (received) in a particular SL resource pool)
(5) Different SL resource pool depending on priority (using SL resource pool based on priority of SL flow or SL packet)

The operation of the SL resource pool applied to one or a combination of (1) to (5) described above may be configured for a transmission pool. The operation of the SL resource pool applied to one or a combination of (1) to (5) described above may be configured for a reception pool. The configurations applied to the transmission pool and the reception pool may be equal to or different from each other.

Also, one or more SL resource pools may be configured for each of the configurations of (1) to (5) described above.

The SL resource pool may include default configurations, terminal-specific configurations, cell-specific configurations, zone-specific configurations, and system-specific configurations, and in an embodiment of the disclosure, the default SL resource pool may be used without the restrictions of (1) to (5) described above. As another embodiment of the disclosure, the default SL resource pool may be used according to a pre-configured configuration.

The configuration for each SL resource pool may be designated in the format of [Table 5] below. Configuration information for the SL resource pool may be acquired by the RRC dedicated signaling, SIB signaling, or pre-configuration method of the terminal transmitted by the base station.

TABLE 5

```
SL-CommTxPoolListV2X ::= SEQUENCE    (SIZE
 (1..maxSL-V2X-TxPool)) OF   SL-
 CommResourcePoolV2X
SL-CommRxPoolListV2X ::= SEQUENCE    (SIZE
 (1..maxSL-V2X-RxPool)) OF   SL-
 CommResourcePoolV2X
SL-CommResourcePoolV2X ::= SEQUENCE {
    resource_info_of_pool_subframe_subchannel
    cast_type  {broadcast, groupcast, unicast}
    allocation_mode {mode 1, mode2}
```

TABLE 5-continued

```
    communication_range {1..max_range}
    HARQ_feedback {enabled, disabled}
    priority {1..max_priority_index}
    application {application type, service type}
...
}
```

The SL-CommTxPoolListV2X or SL-CommRxPoolListV2X of [Table 5] may be configured for each carrier or each BWP.

In the case of Allocation Mode 2, based on the configuration information for each SL resource pool, the terminal may select an SL resource pool corresponding to the configuration of the SL flow or the SL packet and allocate an SL grant thereto. In the case of Allocation Mode 1, based on the configuration information for each SL resource pool, the base station may select an SL resource pool corresponding to the configuration of the SL flow or the SL packet and allocate an SL grant to the terminal.

According to various embodiments of the disclosure, when there are two or more SL resource pools for one SL carrier or one SL BWP, the transmitting terminal may perform an operation of selecting an SL resource pool to be used to transmit an SL packet. When there are two or more SL resource pools for one SL carrier or one SL BWP, the receiving terminal may perform an operation of monitoring an SL resource pool to receive an SL packet.

Figure 9:
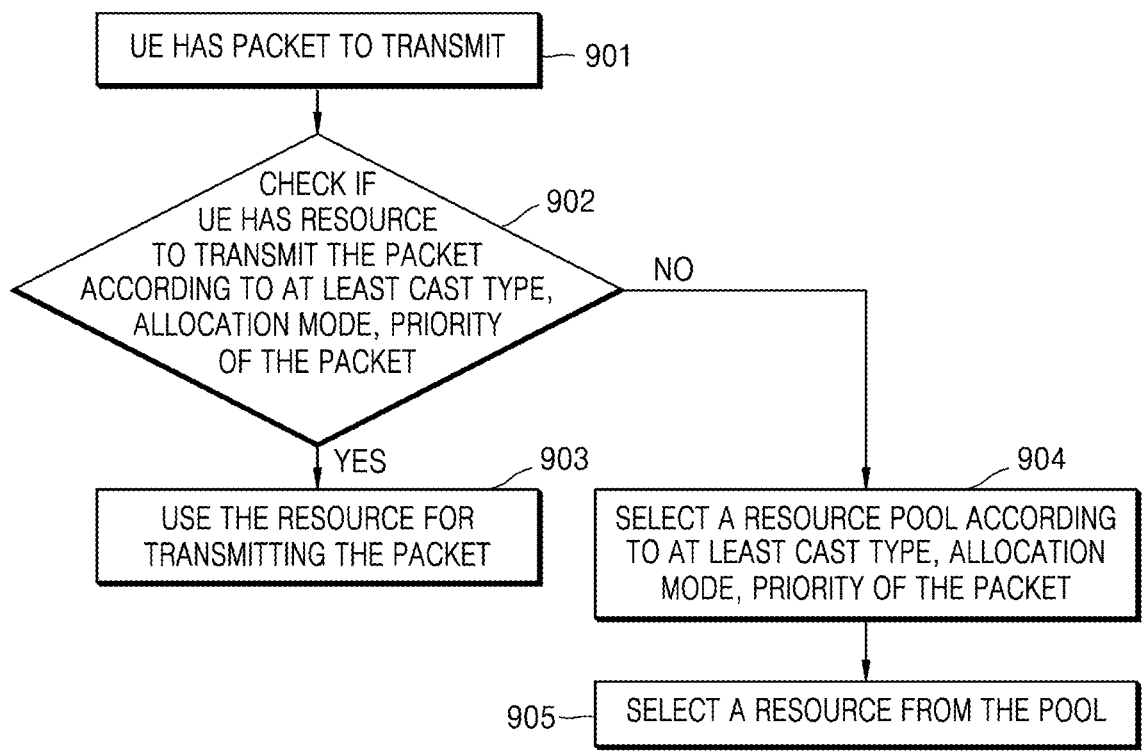
FIG. 9 is a diagram illustrating an operation of a transmitting terminal selecting a resource for transmitting a packet, according to various embodiments of the disclosure.

FIG. 9 is a diagram illustrating an operation of a transmitting terminal selecting a resource for transmitting a packet according to various embodiments of the disclosure.

Referring to FIG. 9, in operation 901, the terminal may have a packet to be transmitted.

In operation 902, the terminal may determine whether there is a transmission resource already allocated according to at least one or a combination of the destination index, cast type, allocation mode, priority, and communication range of the packet to be transmitted.

In operation 903, when there is a transmission resource already allocated for a packet to be transmitted, the terminal may transmit the packet by using the already-allocated transmission resource.

In operation 904, when it is determined that there is no transmission resource already allocated for a packet to be transmitted, the terminal may select an SL resource pool satisfying the SL resource pool selection condition by applying the SL resource pool selection condition based on at least one or a combination of the destination index, cast type, allocation mode, priority, and communication range of the packet to be transmitted.

As an embodiment of the disclosure, the SL resource pool selection condition may be configured for each SL resource pool. As another embodiment of the disclosure, the SL resource pool selection condition may be configured for one or more SL resource pools belonging to the same BWP. As another embodiment of the disclosure, the SL resource pool selection condition may be configured for one or more SL resource pools belonging to the same carrier.

In operation 905, the terminal may allocate a transmission resource to transmit the packet in the SL resource pool selected in operation 904. In operation 904, a condition in which the transmitting terminal selects the SL resource pool for transmitting the SL packet may be configured to at least one or a combination of the configurations of [Table 6] below.

TABLE 6

CBR threshold per pool
(UE measures CBR of pool and decides whether the pool is available for its TX resource or not, or UE measures CBR of pool and decides whether the pool is available for its TX resource based on CBR threshold of SL flow or
CBR threshold of SL packet)
Priority threshold per pool
(UE decision based on priority of SL flow or priority of SL packet)
5QI threshold per pool
(UE decision based on 5QI of SL flow or 5QI of SL packet)
PQI threshold per pool
(UE decision based on PQI of SL flow or PQI of SL packet)
PFI/QFI threshold per pool
(UE decision based on PFI/QFI of SL flow or QFI of SL packet)
PPPP threshold per pool
(UE decision based on PPPP of SL flow or PPPP of SL packet)
PPPR threshold per pool
(UE decision based on PPPR of SL flow or PPPR of SL packet)
Data rate threshold per pool
(UE decision based on data rate of SL flow or SL packet)
Communication range threshold per pool
(UE decision based on communication range requirement of SL flow or SL packet)
V2X application per pool
(UE decision based on V2X application of SL flow or SL packet)
HARQ feedback per pool
(UE decision on HARQ feedback enabled or disabled)

The criteria of [Table 6] may be configured for each carrier, each BWP, or each resource pool. The terminal may acquire the criteria information of [Table 6] in the SIB signaling and/or dedicated RRC signaling transmitted by the base station. The terminal may acquire the criteria information of [Table 6] from the information pre-configured in the terminal.

According to an embodiment of the disclosure, the terminal may select the SL resource pool according to the condition of [Table 6] as follows.

The SL resource pool selection condition may be set to select a transmission resource from a corresponding SL resource pool where the PQI (PC5 QoS Information or PC5 QoS Indicator) value of SL flow or SL packet is greater than the PQI threshold value of the corresponding SL resource pool. The terminal may check the PQI value of the SL flow or the PQI value of the SL packet corresponding to the packet to be transmitted. The terminal may check the PQI threshold value for each SL resource pool. The terminal may select an SL resource pool that has a PQI threshold value smaller than the PQI value of the SL flow or the SL packet corresponding to the packet to be transmitted. When one or more SL resource pools satisfying the PQI condition are selected, the terminal may determine and select one SL resource pool for itself. As another embodiment of the terminal operation in the case where one or more SL resource pools are selected, the terminal may select one SL resource pool by additionally applying other conditions (secondary criteria, third criteria, or the like for SL pool selection) in addition to the PQI condition.

According to an embodiment of the disclosure, the terminal may select the SL resource pool according to the condition in [Table 6] as follows.

The SL resource pool selection condition may be set to select a transmission resource from a corresponding SL resource pool where a communication range value of SL flow or SL packet corresponds to a communication range threshold of the corresponding SL resource pool. The SL resource pool selection condition may be set to select a transmission resource from a corresponding SL resource pool where the communication range value of SL flow or SL packet is equal to or smaller than the communication range threshold of the corresponding SL resource pool. Or, the SL resource pool selection condition may be set to select a transmission resource from a corresponding SL resource pool where the communication range value of SL flow or SL packet is equal to or greater than the communication range threshold of the corresponding SL resource pool. The terminal may check the communication range value of the SL flow or the SL packet corresponding to the packet to be transmitted. When one or more SL flows or one or more SL packets are multiplexed, the terminal may check the communication range value of the SL flow or SL packet having the largest communication range value. The terminal may check the communication range threshold for each SL resource pool. The terminal may select an SL resource pool whose communication range threshold is equal to the communication range value of the packet to be transmitted. Or, the terminal may select an SL resource pool whose communication range threshold is greater than or equal to the communication range value of the packet to be transmitted. Or, the terminal may select an SL resource pool whose communication range threshold is less than or equal to the communication range value of the packet to be transmitted. When one or more SL resource pools satisfying the communication range condition are selected, the terminal may determine and select one SL resource pool for itself. As another embodiment of the terminal operation in the case where one or more SL resource pools are selected, the terminal may select one SL resource pool by additionally applying other conditions (secondary criteria, third criteria, or the like for SL pool selection) in addition to the communication range condition.

According to an embodiment of the disclosure, the terminal may select the SL resource pool according to the condition in [Table 6] as follows.

The SL resource pool selection condition may be set to select a transmission resource from a corresponding SL resource pool where HARQ feedback setting value of SL flow or SL packet is the same as HARQ feedback setting value of the corresponding SL resource pool. The HARQ feedback setting value may correspond to one of HARQ feedback enabled or HARQ feedback disabled. The terminal may check the HARQ feedback setting value of the SL flow or the SL packet corresponding to the packet to be transmitted. The terminal can check the HARQ feedback setting value for each SL resource pool. The terminal may select an SL resource pool whose HARQ feedback setting value is the same as the HARQ feedback setting value of the packet to be transmitted. When one or more SL resource pools satisfying the HARQ feedback setting condition are selected, the terminal may determine and select one SL resource pool for itself. As another embodiment of the terminal operation in the case where one or more SL resource pools are selected, the terminal may select one SL resource pool by additionally applying other conditions (secondary criteria, third criteria, or the like for SL pool selection) in addition to the HARQ feedback setting condition.

According to an embodiment of the disclosure, the terminal may select the SL resource pool according to the condition in [Table 6] as follows.

The SL resource pool selection condition may be set to select a transmission resource from a corresponding SL resource pool where a priority of SL flow or SL packet corresponds to a priority threshold of the corresponding SL resource pool. The SL resource pool selection condition may be set to select a transmission resource from a corresponding SL resource pool where the priority of SL flow or SL packet is equal to or smaller than the priority threshold of the corresponding SL resource pool. Or, the SL resource pool selection condition may be set to select a transmission resource from a corresponding SL resource pool where the priority of SL flow or SL packet is equal to or greater than the priority threshold of the corresponding SL resource pool. The terminal may check the priority value of the SL flow or the SL packet corresponding to the packet to be transmitted. When one or more SL flows or one or more SL packets are multiplexed, the terminal may check the priority value of the SL flow or SL packet having the largest priority value. Priority may be set to an integer value, and the higher the number, the lower the priority. Alternatively, priority may be set to an integer value, and the lower the number, the lower the priority. The terminal may check the priority threshold for each SL resource pool. The terminal may select an SL resource pool whose priority threshold is equal to the priority value of the packet to be transmitted. Or, the terminal may select an SL resource pool whose priority threshold is greater than or equal to the priority value of the packet to be transmitted. Or, the terminal may select an SL resource pool whose priority threshold is less than or equal to the priority value of the packet to be transmitted. When one or more SL resource pools satisfying the priority condition are selected, the terminal may determine and select one SL resource pool for itself. As another embodiment of the terminal operation in the case where one or more SL resource pools are selected, the terminal may select one SL resource pool by additionally applying other conditions (secondary criteria, third criteria, or the like for SL pool selection) in addition to the priority condition.

According to an embodiment of the disclosure, the terminal may select the SL resource pool according to the condition in [Table 6] as follows.

The SL resource pool selection condition may be set to select a transmission resource from a corresponding SL resource pool where a channel busy ratio (CBR) of SL flow or SL packet corresponds to a CBR threshold of the corresponding SL resource pool. The SL resource pool selection condition may be set to select a transmission resource from a corresponding SL resource pool where the CBR of SL flow or SL packet is equal to or smaller than the CBR threshold of the corresponding SL resource pool. Or, the SL resource pool selection condition may be set to select a transmission resource from a corresponding SL resource pool where the CBR of SL flow or SL packet is equal to or greater than the CBR threshold of the corresponding SL resource pool. The terminal may check the CBR of the SL flow or the SL packet corresponding to the packet to be transmitted. When one or more SL flows or one or more SL packets are multiplexed, the terminal may check the CBR of the SL flow or SL packet having the largest CBR. Alternatively, when one or more SL flows or one or more SL packets are multiplexed, the terminal may check the CBR of the SL flow or SL packet having the smallest CBR. The terminal may check the CBR threshold for each SL resource pool. The terminal may select an SL resource pool whose CBR threshold is equal to the CBR of the packet to be transmitted. Or, the terminal may select an SL resource pool whose CBR threshold is greater than or equal to the CBR of the packet to be transmitted. Or, the terminal may select an SL resource pool whose CBR threshold is less than or equal to the CBR of the packet to be transmitted. When one or more SL resource pools satisfying the CBR condition are selected, the terminal may determine and select one SL resource pool for itself. As another embodiment of the terminal operation in the case where one or more SL resource pools are selected, the terminal may select one SL resource pool by additionally applying other conditions (secondary criteria, third criteria, or the like for SL pool selection) in addition to the CBR condition.

Figure 10:
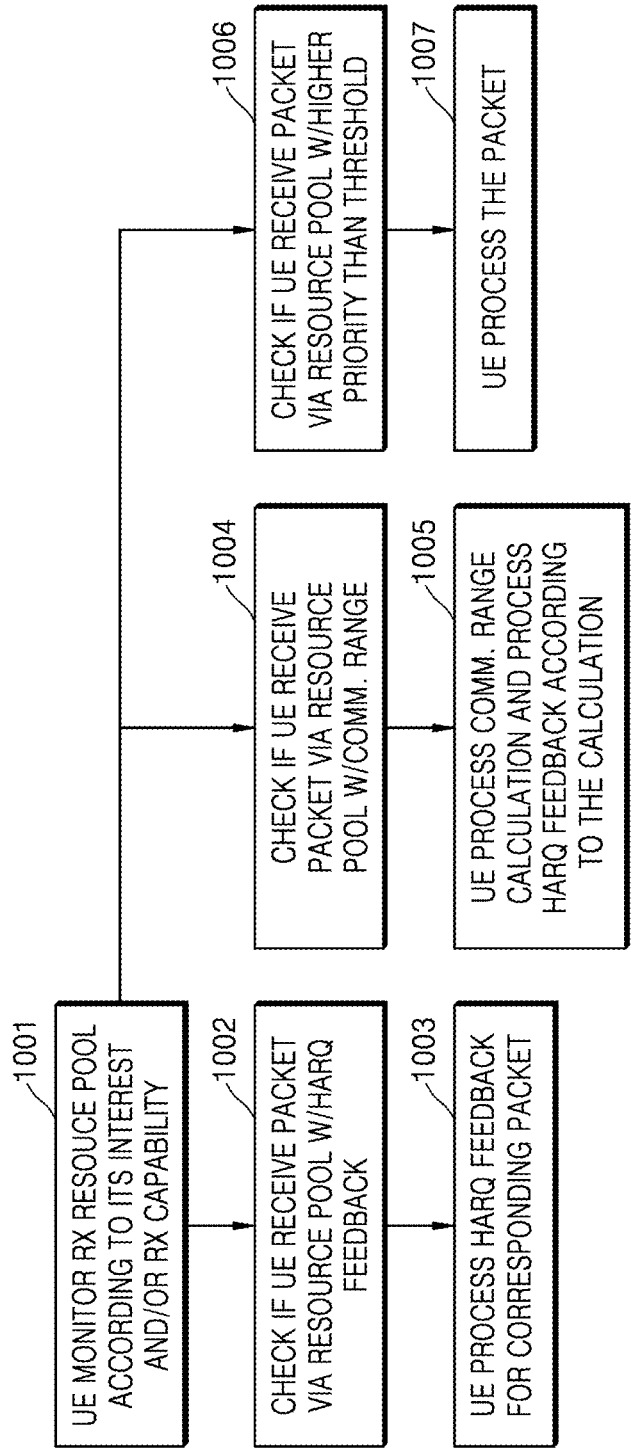
FIG. 10 is a diagram illustrating an operation of a receiving terminal monitoring a resource for receiving a packet, according to various embodiments of the disclosure.

FIG. 10 is a diagram illustrating an operation of a receiving terminal monitoring a resource for receiving a packet according to various embodiments of the disclosure.

Referring to FIG. 10, in operation 1001, the terminal may monitor at least one RX SL resource pool based on its own interest and/or RX capability. The reception interest of the terminal may be represented by at least one or a combination of V2X application, cast type, PQI, communication range, priority, allocation mode, and HARQ feedback. The reception interest of the terminal may correspond to the configuration of [Table 5] and/or the configuration of [Table 6] described above. The RX capability of the terminal may include, for example, the number of antennas of the terminal, the switching time between carriers or the switching time between BWPs, the number of carriers that may be simultaneously received, and the number of BWPs that may be simultaneously received.

In operation 1002, the terminal may determine whether HARQ feedback enabled or HARQ feedback disabled is configured for the SL resource pool.

In operation 1003, the terminal may process HARQ feedback for the packet received from the pool, based on the HARQ feedback enabled or HARQ feedback disabled configuration of the SL resource pool. When HARQ feedback disabled is set in the SL resource pool, the terminal may not need to transmit HARQ feedback for the received packet.

In operation 1004, the terminal may determine whether a communication range is configured for the SL resource pool. The communication range configured in the SL resource pool may be used as information indicating that only a terminal satisfying the communication range may receive a packet from the corresponding SL resource pool.

In operation 1005, the terminal may receive and process a packet from the SL resource pool based on the communication range configuration of the SL resource pool. According to an embodiment of the disclosure, the terminal satisfying the communication range configuration may transmit HARQ feedback for the packet received from the SL resource pool. According to an embodiment of the disclosure, the terminal failing to satisfy the communication range configuration may not receive a packet from the SL resource pool or may not transmit HARQ feedback even when receiving the same.

In operation 1006, the terminal may determine whether a priority is configured for the SL resource pool.

In operation 1007, the terminal may receive and process a packet from the SL resource pool based on the priority configuration of the SL resource pool. According to an embodiment of the disclosure, the terminal may determine whether there is a resource pool satisfying a priority criterion desired by the terminal, and may receive a packet from the resource pool satisfying the priority criterion. The priority criterion desired by the terminal may mean the priority of the interest V2X application of the terminal, the priority of the interest PQI, the priority of the interest PFI, the priority of the interest 5QI, the priority of the SL flow, or the priority of the SL packet.

Although not illustrated in the embodiment of FIG. 10 described above, the terminal may determine whether the condition the same as in as operation 1002, 1004, or 100 is satisfied for each SL resource pool according to each configuration of [Table 5] and/or each configuration of [Table 6] described above, and may determine packet reception from the SL resource pool.

Figure 11:
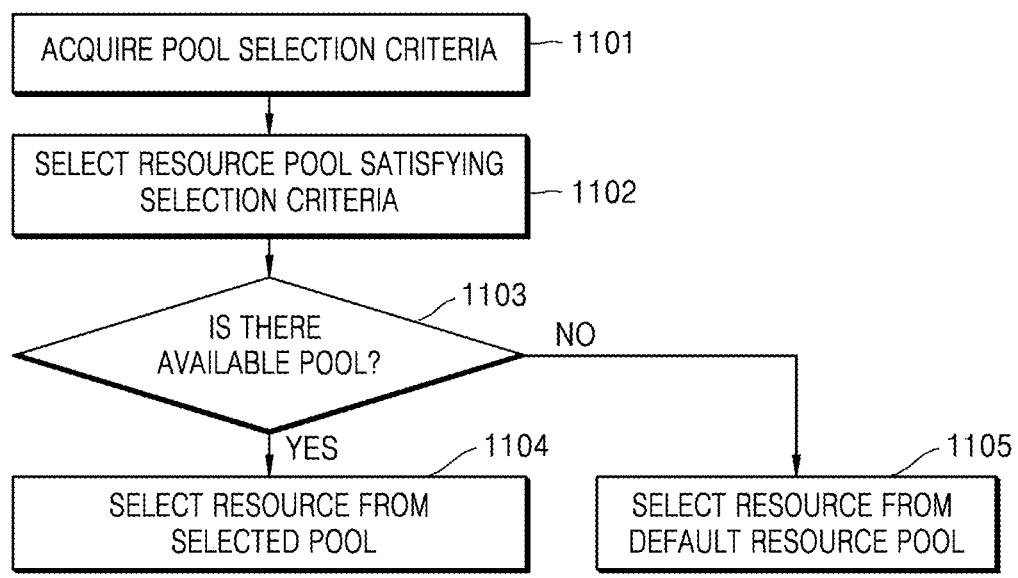
FIG. 11 is a diagram illustrating an operation of a transmitting terminal selecting a transmission resource pool and a resource, according to various embodiments of the disclosure.

FIG. 11 is a diagram illustrating an operation of a transmitting terminal selecting a transmission resource pool and a resource according to various embodiments of the disclosure.

Referring to FIG. 11, in operation 1101, the terminal may acquire an SL resource pool selection condition as illustrated in [Table 6].

In operation 1102, the terminal may determine whether the pool selection condition of operation 1101 is satisfied for each SL resource pool, and may select a pool satisfying the condition.

In operation 1103, the terminal may determine whether an SL resource pool for transmitting the packet is selected in operation 1102 described above.

In operation 1104, when there is an SL resource pool to be used for packet transmission, the terminal may allocate a resource in the selected SL resource pool. For example, when it is determined that one or more SL resource pools are available, the terminal may randomly select one SL resource pool. As another embodiment of the disclosure, when it is determined that one or more SL resource pools are available, the terminal may select one SL resource pool by additionally applying one or more selection conditions in addition to the selection condition applied in operation 1102.

In operation 1105, when it is determined that there is no SL resource pool to be used for packet transmission, the terminal may select a default SL resource pool and allocate a resource from the default SL resource pool. Alternatively, the terminal may select a pre-configured SL resource pool and allocate a resource from the pre-configured SL resource pool. Alternatively, the terminal may randomly select one from among the SL resource pools acquired in operation 1101, allocate a resource, and apply a minimum TX configuration to the allocated SL resource. Alternatively, the terminal may select an SL resource pool having the same allocation mode among the SL resource pools acquired in operation 1101. The terminal may allocate an SL resource from the selected resource pool and apply a minimum TX configuration to the allocated SL resource. Alternatively, the terminal may select an SL resource pool having the same cast type among the SL resource pools acquired in operation 1101. The terminal may allocate an SL resource from the selected resource pool and apply a minimum TX configuration to the allocated SL resource.

According to various embodiments of the disclosure, a sidelink logical channel scheduling request-mask parameter may be configured for a particular SL logical channel. The sidelink logical channel scheduling request-mask parameter described above may be transmitted to the terminal through an RRC control message transmitted by the base station. As an embodiment of the disclosure, the sidelink logical channel scheduling request-mask parameter may be configured for each sidelink logical channel. As another embodiment of the disclosure, the sidelink logical channel scheduling request-mask parameter may be configured for a sidelink logical channel in which a sidelink configured grant type 1 and/or a sidelink configured grant type 2 are/is configured. The configuration information for the sidelink logical channel scheduling request-mask parameter may be included in the sidelink logical channel configuration of [Table 2] described above.

The configuration information about the sidelink logical channel scheduling request-mask parameter may be included in the sidelink logical channel configuration of [Table 2] described above.

```
LogicalChannelConfig ::=            SEQUENCE {
sl-SpecificParameters               SEQUENCE {
...
slLogicalChannelSR-Mask             BOOLEAN,
...
} OPTIONAL, -- Cond SL
...
}
```

The above sidelink logical channel scheduling request-mask may be configured to restrict an operation of triggering a sidelink scheduling request (SR) and triggering a sidelink buffer status report (SL BSR) for transmission of a packet in a terminal buffer even when the terminal is configured with an SL configured grant.

An operation of the terminal processing a regular SL BSR for the sidelink logical channel configured with the sidelink logical channel scheduling request-mask described above may be as follows.

When it is determined that at least one SL BSR has been triggered and has not been canceled, the terminal may determine that the regular SL BSR has been triggered and a sidelink logical channel scheduling request-delay timer (sl-LogicalChannelSR-DelayTimer) is not running, and when at least one of the following conditions is satisfied, the terminal may trigger a scheduling request for the sidelink.

(1) When there is no available SL resource required for new transmission
(2) When a configured sidelink grant is configured and a sidelink logical channel scheduling request-mask is configured as false for a logical channel where a regular BSR is triggered.
(3) When an (available) SL resource capable of new transmission fails to satisfy an SL LCP mapping restriction configured for a logical channel where an SL BSR is triggered.

Figure 12:
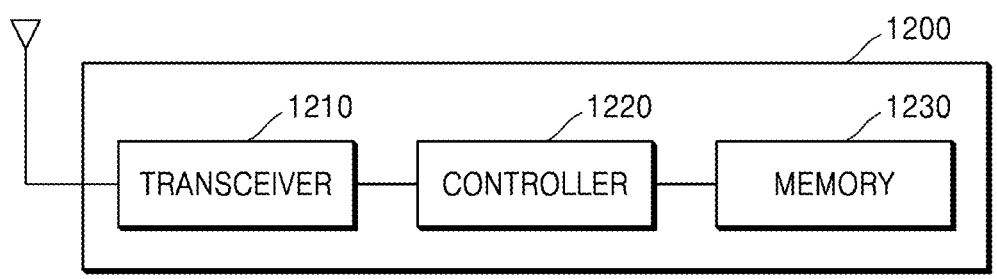
FIG. 12 is a block diagram illustrating an internal structure of a transmitting terminal according to an embodiment of the disclosure.
Figure 13:
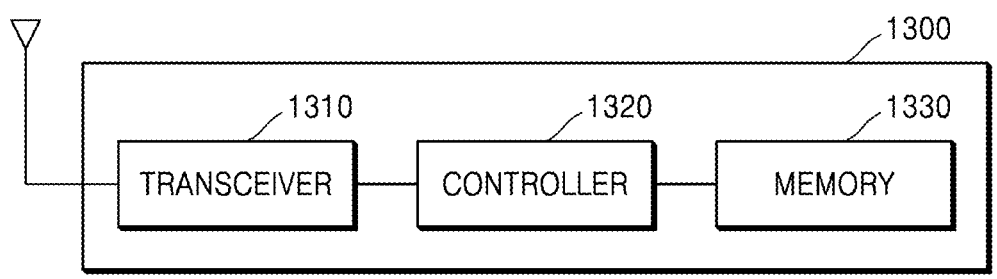
FIG. 13 is a block diagram illustrating an internal structure of a receiving terminal according to an embodiment of the disclosure.

FIGS. 12 and 13 illustrate an apparatus for performing embodiments of the disclosure.

FIG. 12 is a block diagram illustrating an internal structure of a transmitting terminal according to an embodiment of the disclosure.

Referring to FIG. 12, a transmitting terminal 1200 of the disclosure may include a transceiver 1210, a controller 1220, and a memory 1230. However, the components of the transmitting terminal 1200 are not limited to the above example. For example, the transmitting terminal 1200 may include more components or fewer components than the above components. In addition, the transceiver 1210, the controller 1220, and the memory 1230 may be implemented as a single chip. The transceiver 1210 may transmit or receive signals to or from a base station or another terminal. The signals transmitted/received by the transmitting terminal 1200 may include a synchronization signal, a reference signal, control information, and data. For this purpose, the transceiver 1210 may include, for example, an RF transmitter for upconverting and amplifying a transmitted signal and an RF receiver for low-noise-amplifying and downconverting a received signal. However, this is merely an embodiment of the transceiver 1210, and the components of the transceiver 1210 are not limited to the RF transmitter and the RF receiver. Also, the transceiver 1210 may receive a signal through a radio channel and output the signal to the controller 1220 and may transmit a signal output from the controller 1220, through a radio channel. The controller 1220 may control a series of processes such that the transmitting terminal 1200 may operate according to the above embodiments of the disclosure. The controller 1220 may include at least one processor. The memory 1230 may store programs and data necessary for the operation of the transmitting terminal 1200. Also, the memory 1230 may store control information or data included in the signals transmitted/received by the transmitting terminal 1200. The memory 1230 may include a storage medium or a combination of storage media such as ROM, RAM, hard disk, CD-ROM, and DVD. Also, the memory 1230 may be provided in a multiple number.

FIG. 13 is a block diagram illustrating an internal structure of a receiving terminal according to an embodiment of the disclosure.

Referring to FIG. 13, a receiving terminal 1300 of the disclosure may include a transceiver 1310, a controller 1320, and a memory 1330. However, the components of the receiving terminal 1300 are not limited to the above example. For example, the receiving terminal 1300 may include more components or fewer components than the above components. In addition, the transceiver 1310, the controller 1320, and the memory 1330 may be implemented as a single chip. The transceiver 1310 may transmit or receive signals to or from a base station or another terminal. The signals transmitted/received by the receiving terminal 1300 may include a synchronization signal, a reference signal, control information, and data. For this purpose, the transceiver 1310 may include, for example, an RF transmitter for upconverting and amplifying a transmitted signal and an RF receiver for low-noise-amplifying and downconverting a received signal. However, this is merely an embodiment of the transceiver 1310, and the components of the transceiver 1310 are not limited to the RF transmitter and the RF receiver. Also, the transceiver 1310 may receive a signal through a radio channel and output the signal to the controller 1320 and may transmit a signal output from the controller 1320, through a radio channel. The controller 1320 may control a series of processes such that the receiving terminal 1300 may operate according to the above embodiments of the disclosure. The controller 1320 may include at least one processor. The memory 1330 may store programs and data necessary for the operation of the receiving terminal 1300. Also, the memory 1330 may store control information or data included in the signals transmitted/received by the receiving terminal 1300. The memory 1330 may include a storage medium or a combination of storage media such as ROM, RAM, hard disk, CD-ROM, and DVD. Also, the memory 1330 may be provided in plurality.

The methods according to the embodiments of the disclosure described in the specification or the claims may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Also, the programs may be stored in a memory configured by a combination of some or all of such storage devices. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured by any combination thereof. Such a storage device may be connected through an external port to an apparatus performing an embodiment of the disclosure. Also, a separate storage device on a communication network may be connected to an apparatus performing an embodiment of the disclosure.

In the above particular embodiments of the disclosure, the components included in the disclosure are expressed in the singular or plural according to the presented particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a user equipment (UE), in a wireless communication system, the method comprising:
   obtaining sidelink logical channel configuration information corresponding to a logical channel and including a sidelink logical channel priority (sl-priority) information;
   selecting a destination associated with one of unicast, groupcast, or broadcast having a logical channel with a highest priority, based on the sl-priority information, for a sidelink grant, selecting at least one logical channel based on the selected destination;
   allocating sidelink resources for the sidelink grant to the selected at least one logical channel based on the sl-priority information;
   multiplexing sidelink data included in the selected at least one logical channel to a medium access control (MAC) protocol data unit (PDU); and
   transmitting the MAC PDU to another UE using the sidelink resources.

2. The method of claim 1, wherein the obtaining of the sidelink logical channel configuration information comprises:
   obtaining the sidelink logical channel configuration information from at least one of radio resource control (RRC)-dedicated signaling received from a base station, system information block (SIB) received from the base station, or configuration information pre-configured in the UE.

3. The method of claim 1, wherein the sidelink logical channel configuration information further comprises:
   a configuredGrantType1Allowed parameter that indicates whether a configured grant Type 1 can be used for transmission, and
   an identifier of a logical channel group (LCG ID).

4. The method of claim 3, wherein the selecting of the destination comprises:
   in case that the sidelink grant is a configured grant Type 1 selecting the destination that corresponds to a logical channel configured with a configuredGrantType1Allowed set to true.

5. The method of claim 1, wherein the selecting of the destination comprises:
   selecting the destination associated with one of the unicast, the groupcast, or the broadcast having the logical channel with the highest priority among at least one logical channel including sidelink data available for transmission.

6. The method of claim 1, wherein the MAC PDU does not include sidelink data associated with a cast type different from the one of the unicast, the groupcast, or the broadcast associated with the destination and sidelink data associated with another destination different from the destination.

7. The method of claim 1, wherein a priority of a logical channel and a logical channel group (LCG) for a first signaling radio bearer (SRB) for PC5-S message and a priority of a logical channel and a LCG for a second SRB for PC5-RRC message are configured with highest priority.

8. The method of claim 7, wherein the first SRB and the second SRB are configured differently.

9. The method of claim 1, further comprising:
   transmitting, to a base station, a sidelinkUEInformation message including a sidelink quality-of-service (QoS) flow identifier and a PC5 QoS identifier (PQI),
   wherein the sidelink logical channel configuration information is configured based on the sidelink QoS flow identifier and the PQI.

10. The method of claim 1, further comprising:
    obtaining information of a transmission range corresponding to the logical channel; and
    selecting the destination based on a logical channel configured with a same transmission range as a transmission range configured for the sidelink resources.

11. A user equipment (UE) in a wireless communication system, the UE comprising:
    a transceiver; and
    at least one processor operably connected with the transceiver and configured to:
      obtain sidelink logical channel configuration information corresponding to a logical channel and including a sidelink logical channel priority (sl-priority) information,
      select a destination associated with one of unicast, groupcast, or broadcast having a logical channel with a highest priority, based on the sl-priority information, for a sidelink grant, select at least one logical channel based on the selected destination,
      allocate sidelink resources for the sidelink grant to the selected at least one logical channel based on the sl-priority information,
      multiplex sidelink data included in the selected at least one logical channel to a medium access control (MAC) protocol data unit (PDU), and
      transmit, by controlling the transceiver, the MAC PDU to another UE using the sidelink resources.

12. The UE of claim 11, wherein the at least one processor is further configured to:
    obtain the sidelink logical channel configuration information from at least one of radio resource control (RRC)-dedicated signaling received from a base station, system information block (SIB) received from the base station, or configuration information pre-configured in the UE.

13. The UE of claim 11, wherein the sidelink logical channel configuration information further comprises:

a configuredGrantType1Allowed parameter that indicates whether a configured grant Type 1 can be used for transmission, and an identifier of a logical channel group (LCG ID).

14. The UE of claim 13, wherein the at least one processor is further configured to:

in case that the sidelink grant is a configured grant Type 1 select the destination that corresponds to a logical channel configured with a configuredGrantType1Allowed set to true.

15. The UE of claim 11, wherein the at least one processor is further configured to:

select the destination associated with one of the unicast, the groupcast, or the broadcast having the logical channel with the highest priority among at least one logical channel including sidelink data available for transmission.

16. The UE of claim 11, wherein the MAC PDU does not include sidelink data associated with a cast type different from the one of the unicast, the groupcast, or the broadcast associated with the destination and sidelink data associated with another destination different from the destination.

17. The UE of claim 11, wherein a priority of a logical channel and a logical channel group (LCG) for a first signaling radio bearer (SRB) for PC5-S message and a priority of a logical channel and a LCG for a second SRB for PC5-RRC message are configured with highest priority.

18. The UE of claim 17, wherein the first SRB and the second SRB are configured differently.

19. The UE of claim 11, wherein the at least one processor is further configured to:

transmit, to a base station, by controlling the transceiver, a sidelinkUEInformation message including a sidelink quality-of-service (QoS) flow identifier and a PC5 QoS identifier (PQI), wherein the sidelink logical channel configuration information is configured based on the sidelink QoS flow identifier and the PQI.

20. The UE of claim 11, the at least one processor is further configured to:

obtain information of a transmission range corresponding to the logical channel, and select the destination based on a logical channel configured with a same transmission range as a transmission range configured for the sidelink resources.

* * * * *